US012578584B2

(12) United States Patent (10) Patent No.: US 12,578,584 B2

Martineau (45) Date of Patent: Mar. 17, 2026

(54) CONTAINER SYSTEM FOR MONITORING AND IMAGING AQUATIC ORGANISMS

(71) Applicant: Martineau & Associates, Menlo Park, CA (US)

(72) Inventor: Pierre R. Martineau, Menlo Park, CA (US)

(73) Assignee: Martineau & Associates, Menlo Park, CA (US)

( * ) Notice: Subject to any disclaimer, the term of this patent is extended or adjusted under 35 U.S.C. 154(b) by 0 days.

(21) Appl. No.: 18/449,568

(22) Filed: Aug. 14, 2023

(65) Prior Publication Data

US 2024/0053618 A1 Feb. 15, 2024

Related U.S. Application Data

(60) Provisional application No. 63/371,511, filed on Aug. 15, 2022.

(51) Int. Cl.
| | |
|---|---|
| *A01K 63/00* | (2017.01) |
| *G02B 27/09* | (2006.01) |
| *H04N 23/56* | (2023.01) |
| *A01K 61/13* | (2017.01) |
| *A01K 61/95* | (2017.01) |

(52) U.S. Cl.
CPC ......... *G02B 27/0955* (2013.01); *H04N 23/56* (2023.01); *A01K 61/13* (2017.01); *A01K 61/95* (2017.01)

(58) Field of Classification Search
CPC .... G02B 27/0955; H04N 23/56; A01K 61/95; A01K 61/13
See application file for complete search history.

(56) References Cited

U.S. PATENT DOCUMENTS

| | | | | |
|---|---|---|---|---|
| 4,367,017 A | * | 1/1983 | Jimbou | B23K 26/035 |
| | | | | 359/857 |
| 5,049,757 A | * | 9/1991 | Holzl | G01B 11/00 |
| | | | | 250/225 |
| 5,222,458 A | * | 6/1993 | Pippy | A01K 61/90 |
| | | | | 434/297 |

(Continued)

FOREIGN PATENT DOCUMENTS

GB 2217964 A 11/1989

OTHER PUBLICATIONS

International Application No. PCT/US2023/030178, International Search Report and the Written Opinion, dated Dec. 14, 2023, 7 pages.

*Primary Examiner* — James T Boylan

(74) *Attorney, Agent, or Firm* — Ahmann Kloke LLP

(57) ABSTRACT

A system comprising, an electromagnetic radiation source, the electromagnetic radiation source including at least one collimated electromagnetic radiation beam, a beam expander, the beam expander may expand the at least one collimated electromagnetic radiation beam, a first container including a base plate and at least four side walls, at least two of four side walls being opposite of each other, at least three of the four side walls being perpendicular to the base plate, a fourth side wall including a mirror, the container including a cavity, the mirror including a reflective side facing the cavity, and an image capture device, the image capture device having a field of view, the field of view including at least a portion of the cavity.

21 Claims, 18 Drawing Sheets

(56)        References Cited

U.S. PATENT DOCUMENTS

| | | | | |
|---|---|---|---|---|
| 5,706,760 | A * | 1/1998 | Chang | A01K 63/003 |
| | | | | 119/257 |
| 6,659,043 | B1 * | 12/2003 | Huska | A01K 63/045 |
| | | | | 119/260 |
| 8,651,057 | B1 * | 2/2014 | Welsh | A01K 61/90 |
| | | | | 119/215 |
| 2003/0117614 | A1 * | 6/2003 | Kikuchi | G01M 11/35 |
| | | | | 356/73.1 |
| 2008/0152192 | A1 * | 6/2008 | Zhu | G06V 10/147 |
| | | | | 382/103 |
| 2010/0111359 | A1 * | 5/2010 | Bai | A01K 29/005 |
| | | | | 382/103 |
| 2011/0048332 | A1 | 3/2011 | Lee | |
| 2011/0058160 | A1 * | 3/2011 | Tan | G01N 21/896 |
| | | | | 356/237.2 |
| 2017/0068086 | A1 * | 3/2017 | Tomer | G02B 21/0076 |
| 2018/0027779 | A1 * | 2/2018 | Vissenberg | F21V 7/0083 |
| 2019/0100445 | A1 * | 4/2019 | Dobrinsky | A61L 2/10 |
| 2020/0319217 | A1 * | 10/2020 | Verhoef | C12M 1/005 |
| 2022/0046904 | A1 | 2/2022 | Martineau | |
| 2022/0221648 | A1 * | 7/2022 | Aalto | G02B 6/2766 |

* cited by examiner

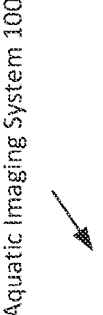
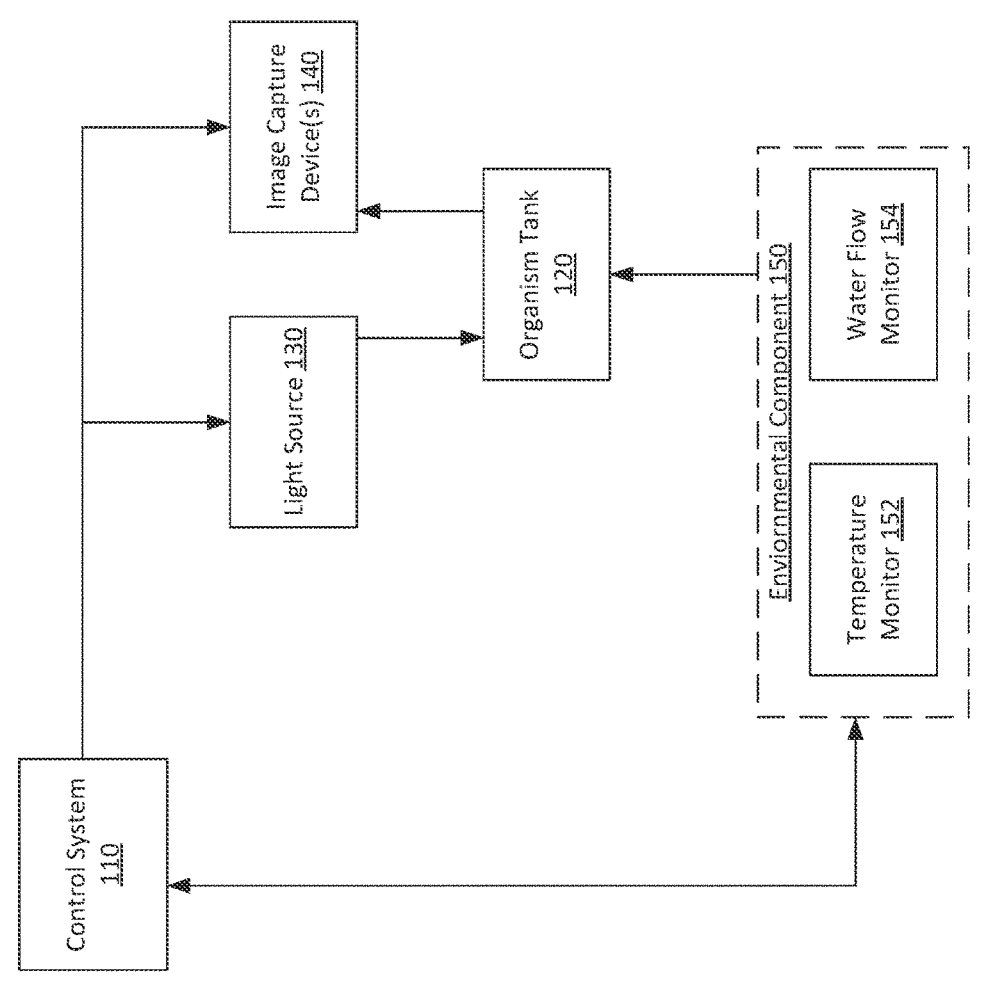
FIG. 1

Bottom View 300

Aquatic Monitoring System 302

Energy Lens 370

Mirror 340

Outer Tanks 304

Inner Tank 500

Front Panel 540

Top 550

Side Panel 522

Width 514

Length 552

Length 512

Width 554

Height 502

Water Evacuation Output 560

View 780

Support
Column 715

Image Capture Device
Assembly 790

Inner Tank
Lid 752

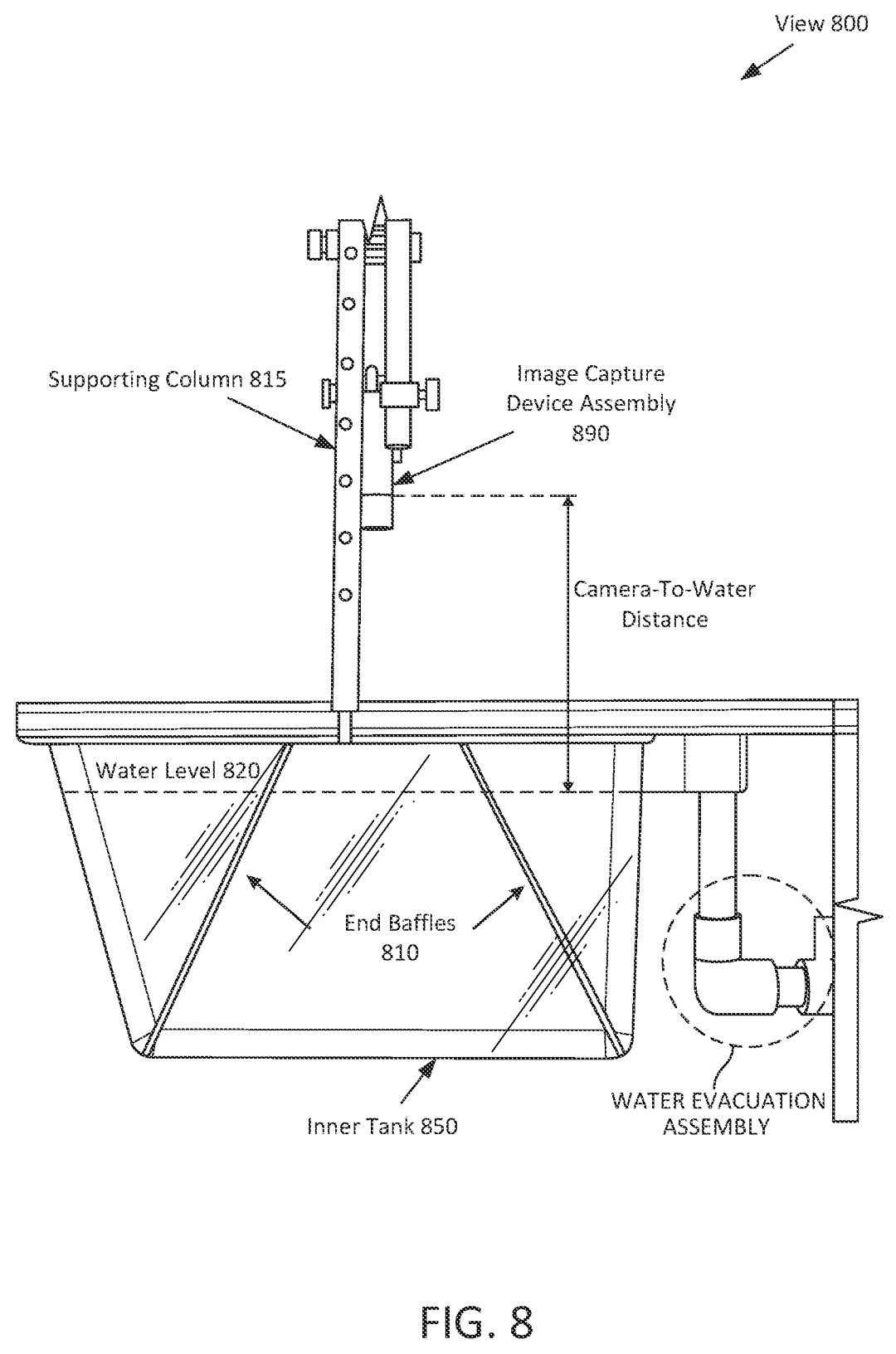

View 800

Supporting Column 815

Image Capture
Device Assembly
890

Camera-To-Water
Distance

Water Level 820

End Baffles
810

Inner Tank 850

WATER EVACUATION
ASSEMBLY

FIG. 8

CANARY TANK SIDE
MIRROR IN 8 L TANK
CONTAINER

1400

MARTINEAU & ASSOCIATES

CANARY TANK WEEKLY REPORT

STATUS: OK

INSTITUTION: XYZ UNIVERSITY
FACILITY: AO34

JULY 22, 2022 - JULY 29, 2022

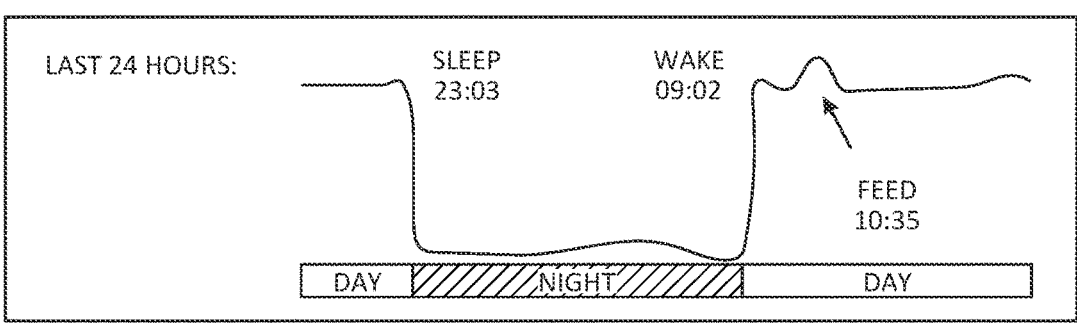

LAST 24 HOURS:

SLEEP 23:03     WAKE 09:02

FEED 10:35

DAY | NIGHT | DAY

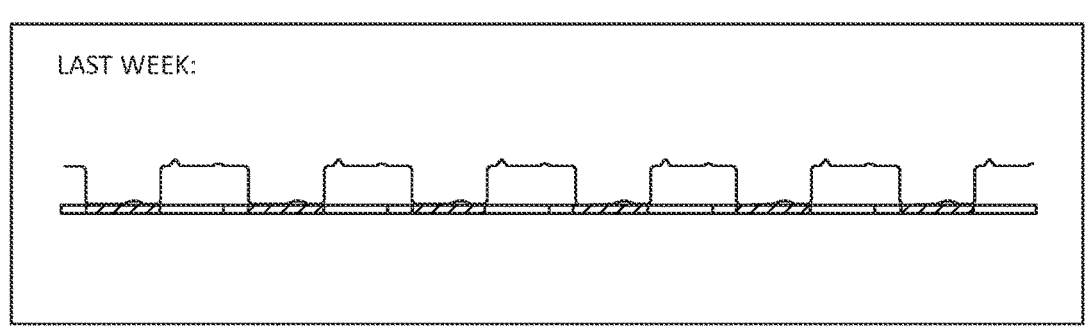

LAST WEEK:

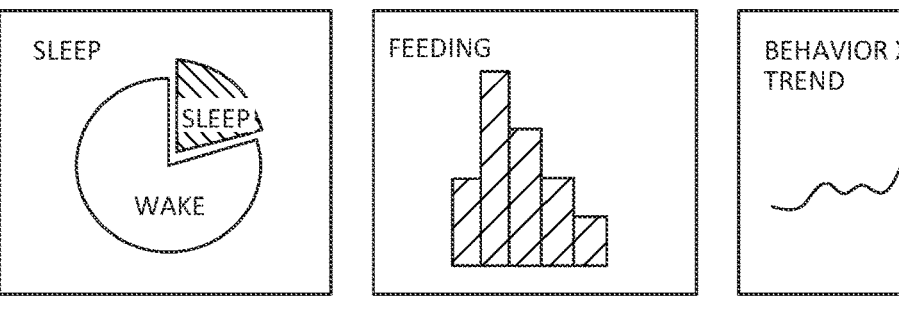

SLEEP

SLEEP
WAKE

FEEDING

BEHAVIOR X TREND

EVENTS:

20220722, 10:34AM: FEEDING DETECTED
20220723, 10:22AM: FEEDING DETECTED
20220724, 10:20AM: FEEDING DETECTED
20220725, 10:14AM: FEEDING DETECTED
20220726, 10:00AM: FEEDING DETECTED
20220727, 4:23AM: POWER OUTAGE!
20220728, 10:00AM: FEEDING DETECTED
20220729, 10:05AM: FEEDING DETECTED

FIG. 14

COMPUTER SYSTEM 1500

BUS 1508

PROCESSOR
1502
INSTRUCTIONS
1524

GRAPHICS
DISPLAY 1510

MAIN
MEMORY 1504
INSTRUCTIONS
1524

ALPHA-NUMERIC
INPUT DEVICE
1512

STATIC MEMORY
1506

CURSOR CONTROL
DEVICE 1514

NETWORK
INTERFACE
DEVICE 1520

STORAGE UNIT
1516
MACHINE READABLE
MEDIUM 1522
INSTRUCTIONS
1524

NETWORK 1526

SIGNAL
GENERATION
DEVICE 1518

CONTAINER SYSTEM FOR MONITORING AND IMAGING AQUATIC ORGANISMS

CROSS-REFERENCE TO RELATED APPLICATIONS

The present application claims benefit of U.S. Provisional Patent Application No. 63/371,511 filed Aug. 15, 2022, entitled "Systems and Methods for Aquatic Animal Monitoring and Wellbeing," which are incorporated by reference herein.

FIELD OF THE INVENTION(S)

Embodiments of the present invention(s) generally relate to an apparatus capable of monitoring and imaging aquatic organisms.

BACKGROUND

Medical research crucially depends on animal models. Medical research often depends upon the availability of animals in good health and in good environmental conditions. The animals need to be in good health because robust animal experiments require subjects in well-documented, standardized health conditions. The animals need to be in good environmental conditions because public awareness puts ever-growing demands on researchers to document how ethical concerns over animal experimentation are mitigated, particularly with regard to vertebrate animals.

Zebrafish (*Danio rerio*), one of the most recent and popular high-throughput vertebrate models, receives over $400M in annual NIH research funding ($450M in 2020 alone—NIH RePORTER), which translates into hundreds of thousands of larvae being spawned for research purposes. Many of these represent unique zebrafish lines expressing specific traits or genetic polymorphisms that are raised to adulthood, living for up to five years in specialized, often centralized, animal facilities of various sizes. Even the smallest zebrafish facilities have numbers well into the thousands. In large research institutions, a typical zebrafish facility may consist of a suite of rooms each hosting thousands of adult tanks on racks.

SUMMARY

In some aspects, the techniques described herein relate to a system including: an electromagnetic radiation source, the electromagnetic radiation source capable of emitting at least one electromagnetic radiation beam; a beam expander, the beam expander configured to receive the at least one electromagnetic radiation beam emitted by the electromagnetic radiation source and expand the at least one electromagnetic radiation beam to generate at least one expanded electromagnetic radiation beam; a first container including a base plate and at least four side walls, at least two of four side walls being opposite of each other, at least three of the four side walls being substantially perpendicular to the base plate, a fourth side wall of the at least four side walls being including a mirror, the container including a cavity located between the at least four side walls, the mirror including a reflective side facing the cavity and configured to direct the at least one expanded electromagnetic radiation beam through the cavity; and an image capture device, the image capture device having a field of view, the field of view including at least a portion of the cavity.

The first container may further include a water evacuation assembly.

In some embodiments, the system further includes a second container, the second container may be positioned in the first container. The field of view of the image capture device may include a portion of the second container. The second container may further include a water evacuation assembly.

The fourth wall may be at an angle relative to the base plate such that the mirror is angled to direct the at least one expanded electromagnetic radiation beam through the cavity. The system may further include a lid, which may be positioned opposite to the base plate. The lid may have a surface area that is greater than that of a surface area of the base plate. The lid may further include heating pads positioned along a perimeter of the lid.

In some embodiments, the beam expander further includes a collimator. The mirror may be coupled to the fourth wall.

In various embodiments, the fourth wall is at an angle relative to the base plate such that the mirror is angled to direct the at least one expanded electromagnetic radiation beam through the second container. The second container may be transparent at least in part. The at least one expanded electromagnetic radiation beam may be reflected through a transparent portion of the second container in a direction that is substantially parallel to the base plate.

An example method may include originating a electromagnetic radiation beam from an electromagnetic radiation source; transmitting the electromagnetic radiation beam through a beam expander, an output of the beam expander being an expanded electromagnetic radiation beam, to a mirror; reflecting the expanded electromagnetic radiation beam by a mirror through a first container, the first container having a base plate and at least four side walls, at least two of four side walls being opposite of each other, at least three of the four side walls being substantially perpendicular to the base plate, a fourth side wall of the at least four walls including a mirror, the container including a cavity located between the at least four side walls, the mirror including a reflective side facing the cavity; directing, with an image capture device, a field of view to at least a portion of the cavity of the first container; and capturing, with the image capture device, at least one image of the at least portion of the cavity of the first container that is illuminated at least in part by the reflected expanded electromagnetic radiation beam.

The first container may further include a water evacuation assembly. The first container may further include a second container positioned in the first container. The field of view of the image capture device includes a portion of the second container. The second container may further include a water evacuation assembly.

In some embodiments, the fourth wall is at an angle relative to the base plate such that the mirror is angled to direct the at least one expanded electromagnetic radiation beam through the cavity. The first container may further include a lid positioned opposite to the base plate. The lid may have a surface area that is greater than that of a surface area of the base plate. The lid may further include heating pads positioned along a perimeter of the lid.

In some aspects, the techniques described herein relate to a method, further including collimating the electromagnetic radiation beam before reflecting the expanded electromagnetic radiation beam. The mirror maybe coupled to the fourth wall.

In various embodiments reflecting the expanded electromagnetic radiation beam by the mirror through the first container includes reflecting the expanded electromagnetic radiation beam by the mirror through the second container located within the first container, wherein the fourth wall is at an angle relative to the base plate such that the mirror is angled to direct the expanded electromagnetic radiation beam through the second container, the second container being transparent at least in part, the at least one expanded electromagnetic radiation beam being reflected through a transparent portion of the second container in a direction that is substantially parallel to the base plate.

BRIEF DESCRIPTION OF THE DRAWINGS

FIG. 1 depicts a block diagram of an example aquatic monitoring system capable of providing a controlled environment to illuminate and capture images of aquatic organisms.

FIG. 8 depicts a side view of the inner tank according to some embodiments.

FIG. 14 depicts another example user interface of the aquatic monitoring system summarizing organism activity over a period of time according to some embodiments.

DETAILED DESCRIPTION

Figure 2A:
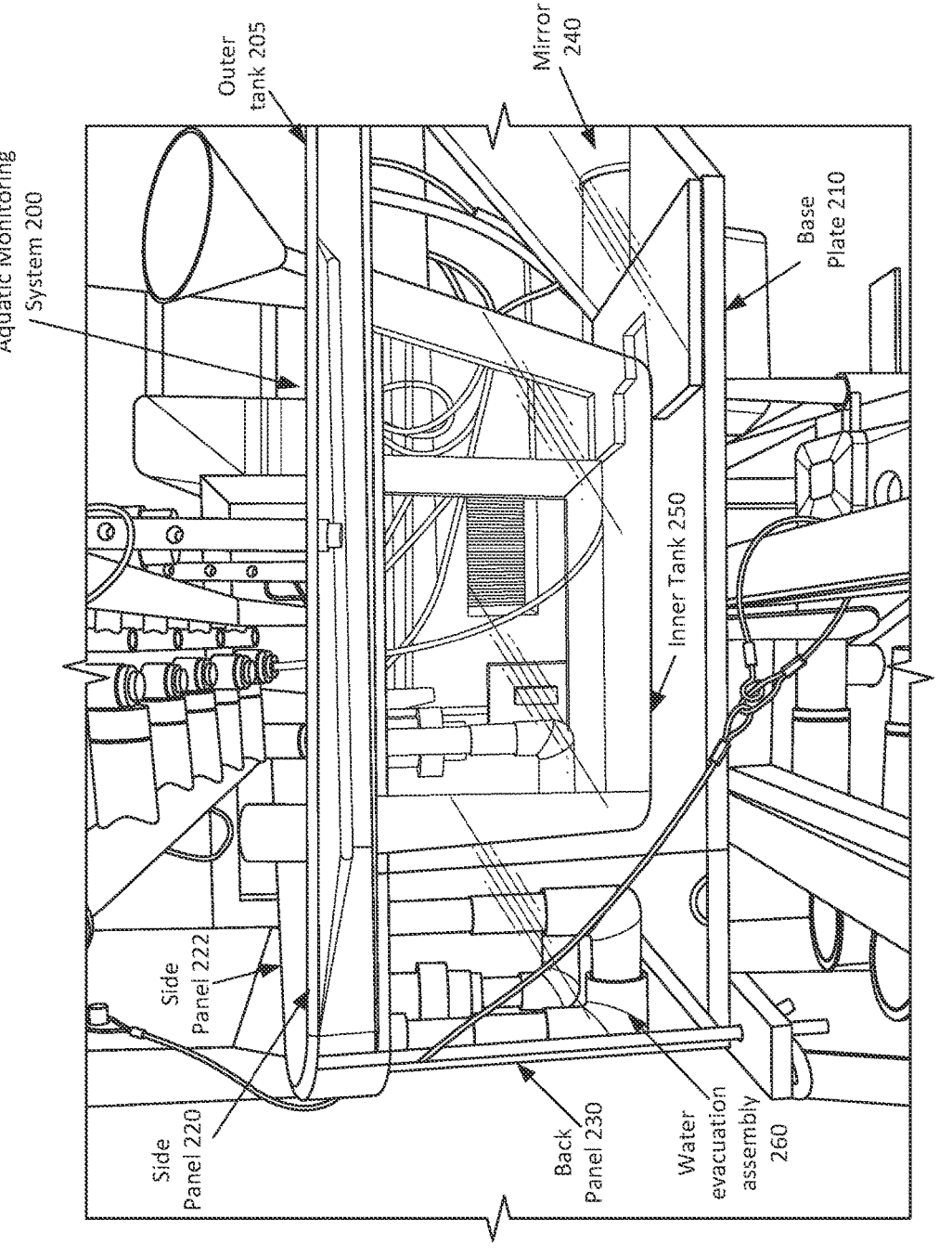
FIG. 2A depicts a side view of the aquatic monitoring system according to some embodiments.

Current state-of-the-art fish facilities only track measures of water quality such as temperature, pH, and salinity by sampling these parameters at regular intervals and by analyzing post-mortem fish (e.g., that are sacrificed or suffer premature death in the facility. Environmental issues (e.g., vibrations or noises), system dysfunctions (e.g., light cycle disturbances or electrical leaks), behavioral issues (e.g., heightened anxiety or bullying), and all factors that cannot easily be monitored via water sampling typically go undetected unless humans take notice. Simple questions such as "are the fish hungry?" cannot be answered unless a human is in the room. Other important, more complex questions, such as food intake, anxiety levels, or sleep fragmentation, often cannot be answered.

Human presence is sparse in the fish room and a single fish technician may have to care for 1,000 tanks containing up to 20,000 fish daily, having less than a minute to attend to each tank, typically only to feed the fish. As a result, unhealthy fish frequently go unnoticed until it is too late or until a scientist notices a substandard breeding output. Worse still, many serious infections only yield subtle behavioral changes that mere spot checks cannot detect. This situation, hardly acceptable under normal conditions, may become critical in times of temporary labor shortage or crisis. Enhanced oversight is simply not feasible for human staff to provide.

Further, for data reproducibility, the inevitable institution-to-institution variation in these important factors should be reported in a standard way, yet no standardized platform allows for the recording and reporting of these data. The adoption of zebrafish and the "regulatory burden" to which fish facilities are subject is only increasing.

As a result, there is a substantial growing market for husbandry devices. Systems and methods described herein are directed at retaining and observing aquatic organisms for scientific, aquaculture, and/or environmental purposes (e.g., aquatic pollution monitoring).

Any aquatic organisms, such as fish (e.g., zebrafish), amphibian larvae, invertebrates, or the like, may be observed. Images and/or video of aquatic organisms may be captured to observe the effects of various tests or merely to record their natural behavior. Various embodiments described herein enable any number of aquatic organisms to be observed through an apparatus that allows light to be transmitted parallel to the base (or in any direction other than directly through the lens of an image capture device discussed herein) of one or more organism tanks. The various embodiments further include one or more cameras configured to take images or video of the aquatic organisms. The systems and methods described herein may allow for detailed information of the behavior and reactions of the aquatic organisms to be reliably collected in a variety of different environments.

FIG. 1 depicts a simplified block diagram of an example aquatic monitoring system 100 capable of providing a controlled environment to monitor and capture images of aquatic organisms. More specific examples of systems are depicted in FIGS. 2A-11.

Generally, the example aquatic monitoring system 100 includes a control system 110, an organism tank 120, a light source 130, an image capture device 140, and an optional environmental component 150. The optional environmental component 150 in this example includes a temperature monitor 152 and a water flow monitor 154.

An organism tank 120 is configured to hold water and any number of aquatic organisms. The light source 130 may be configured to transmit light (or energy at any wavelength(s)) through the organism tank 120. In various embodiments, the light source 130 may generate and direct light in a direction that is substantially parallel to the base of the tank, thereby illuminating the aquatic organisms in order to enable the image capture device 140 to capture images and/or video of the aquatic organisms.

Images and/or video may be analyzed using, for example, remanent imaging as discussed herein to detect changes in the behavior of the aquatic organisms and/or environmental factors (e.g., feeding, lighting, and the like).

It will be appreciated that light source 130 may include one or more light sources. In some embodiments, the light from the light source 130 may be split to transmit any number of beams of light. In one example, the aquatic monitoring system 100 includes a beam expander which takes the rays of light from the light source 130 and expands them in size. The aquatic monitoring system 100 may include any number of image capture devices 140 and any number of organism tanks 120. The light source 130 may emit electromagnetic energy from a wide variety of spectrums. In some embodiments, the light source 130 may emit electromagnetic energy from the 850 nanometer (nm) range (e.g., +/−10 nm), or the near-infrared (NIR) band.

In some embodiments, the light source 130 is a laser that generates a beam of light that is expanded to illuminate the organism tank 120 using a beam expander. An example of a beam expander can be seen in FIG. 6. A energy lens 600 of FIG. 6 includes a condenser lens, light from a laser may be expanded and be reflected by a mirror into the inner tank 250 of FIG. 2A. In one example, the light source 130 may be or include a 10 mW 850 nm alignment laser.

The image capture device 140 is an imaging sensor that may capture one or more images of a scene in the form of a data stream (an image stream, a pixel stream, byte stream, or the like). In some embodiments, the image capture device 140 uses an exposure time that is inverse of the frame rate of the image capture device 140. The image capture device 140 may be coupled to the aquatic organism control system 110. In some embodiments, one or more of the image capture devices 140 is positioned below or substantially below one of the organism tanks 120.

In some embodiments, the image capture device 140 may include a digital camera capable of capturing digital images and digital video. The aquatic monitoring system 100 may receive a data stream captured by sensors, extract motion information from the data stream, and store the data via a storage component. The storage component may store images, information extracted from the images, and other data generated by the image capture device 140. The aquatic monitoring system 100 may access the storage and an optional display via a network or directly.

In one example, the image capture device 140 may include or be a 720×540 CMOS monochrome industrial camera with a lens 3.6 mm in focal length and 12.5 mm in diameter. The image capture device 140 may include a filter such as a 25 mm diameter longpass filter, cut-on wavelength of 800 nm.

In some embodiments, the aquatic organisms are macroorganisms, such as adult zebrafish. The image capture device 140 may be capable of imaging aquatic organisms ranging in size, for example, from $10^{-4}$ m or less to $10^{-1}$ m. For example, images of smaller sized aquatic organisms may be captured by adjusting the pixel resolution of an image sensor of the image capture device 140 and/or adjusting the lens magnification of the image capture device 140. It will be appreciated that images may be taken of aquatic organisms of any size. In some embodiments, imaging aquatic organisms larger than 5 $10^{-2}$ m or 5 centimeter (cm) may require an increase of the height of the water column in the organism tank. The area occupied by the tank illuminator holder may increase with the square of the height of the water column in the organism tank.

In one embodiment, the aquatic monitoring system 100 includes one or more environmental components 150. Environmental components 150 may include a water flow monitor 154.

One of the environmental components 150 may include a temperature monitor 152. The temperature monitor 152 may include a mechanism to monitor and/or provide feedback or alerts regarding the temperature of liquid or water in one or more of the organism tanks 120. These mechanisms may include thermometers and/or infrared sensors capable of measuring the temperature of the water in one or more organism tanks 120. If the temperature of the water is outside a predetermined temperature range, the temperature monitor 152 may send an alert to a digital device and/or a signal to a control system (e.g., operated by a lab) to change conditions. The aquatic organism control system 110 may send a notification to the user of the fluctuation in the temperature of one or more organism tanks 120.

The water flow monitor 154 may include a water evacuation assembly which allows water to flow into and out of the organism tank 120. The water flow monitor 154 may control or monitor the water flow rate, or how often water in the organism tank 120 is replaced. Replacing or refreshing the water flowing through the organism tank 120 may determine oxygen saturation of the water.

In some embodiments, the water flow monitor 154 may monitor other properties of the water, including pH, salinity, and the like. In various embodiments, the water monitor 154 may use or receive input from any number of sensors configured to take measurements of the water (e.g., pH, salinity, and the like).

In some embodiments, the aquatic organism control system 110 includes at least one processor and memory. The aquatic organism control system 110 may generate commands and parameters with which the aquatic organism control system 110 controls the equipment or hardware of the aquatic monitoring system 100. In various embodiments, the processor is one or several CPUs, GPUs, FPGAs, VLSI, and/or smart sensor chips. Any number of methods and operations performed by the aquatic organism control system 110 may be performed sequentially or in parallel depending on the task and thus takes advantage of CPU architectures that facilitate parallel processing. It may be appreciated that the memory of aquatic organism control system 110 may comprise non-transitory computer-readable media and may be implemented using any suitable memory technology, such as static random access memory (SRAM), synchronous dynamic RAM (SDRAM), nonvolatile/Flash-type memory, or any other type of memory. The memory of the aquatic organism control system 110 may store program instructions, image data, or the like.

The aquatic monitoring system 100 may be placed on a benchtop vibration isolation platform to insulate the system from external vibrations. In some embodiments, the aquatic monitoring system 100 may be placed on a rack. In various embodiments, the One or more components of the hardware system may be composed of one or more of poly (methyl methacrylate), polycarbonate, or FEP.

FIGS. 2A-11 depict organism tanks and/or aquatic monitoring systems that include all or some of the components discussed with regard to FIG. 1. It will be appreciated that the components (e.g., referred to in FIG. 1 which are also in the following figures) may be located in any number of locations to illuminate (e.g., using visible or non-visible energy) and capture images and/or video of aquatic organisms maintained in a tank.

FIG. 2A depicts a side view of an example aquatic monitoring system 200 according to some embodiments. The aquatic monitoring system 200 depicted in FIG. 2A includes an outer tank 205, a mirror 240, an inner tank 250, and a water evacuation assembly 260. In this example, the inner tank 250 is within the outer tank 205. The inner tank 250 may be filled with water to hold the aquatic organisms. The mirror 240 may be used to direct energy (e.g., collimated light) across the inner tank 250 (e.g., in a manner that is parallel to the base of the inner tank 250) to assist in capturing images or video of the aquatic organisms in the inner tank 250.

It will be appreciated that the energy may be directed in any number of directions as long as the energy is ultimately transmitted through the cavity of the inner tank 250 to illuminate the aquatic organisms. In various embodiments, the energy is not directed directly through the lens of an image capture device.

The outer tank 205 may hold the inner tank 250. The outer tank 205 may be any shape. In the example in FIGS. 2A and 2B, the outer tank is generally rectangular with a slanted side (in this example, the slanted side is the forward side that is away from a rack that holds or provides support to the outer tank 205). The slanted side may include a mirror (e.g., the slanted side may be mirrored through the application of a reflective surface or mirror attachment).

In the example of FIG. 2A, the outer tank 205 may include a base plate 210, side panels 220 and 222, and a back panel 230. Side panels 220 and 222 and the back panel 230 may form three side walls of the outer tank 205. In some embodiments, the side panels 220 and 222 and the back panel 230 may be 90°, perpendicular or substantially perpendicular to the base plate 210. The outer tank 205 may include a fourth wall, the fourth wall may be at an angle to the base plate 210. As discussed herein, a reflective surface such as a mirror may be adhered to the fourth wall. In one example, the fourth wall is composed of acrylic or polycarbonate. The walls of the outer tank 205 may form a cavity that may hold water, aquatic organisms, and/or the inner tank 250.

The outer tank 205 includes the back panel 230, side panels 220 and 222, and fourth wall configured such that the outer tank 205 may contain water and/or an inner tank 250. It will be appreciated that the side panels 220 and 222 as well as the back panel 230 and fourth wall may each be at any angle relative to the base plate 210.

In this example, the outer tank 205 has a length 212 of approximately 36.5 cm, a height 214 of 17 cm, and a depth 216 of 21.5 cm. the outer tank 205 may have any length, height, and depth. In various embodiments, the outer tank 205 has dimensions such that the outer tank 205 may contain all or part of the inner tank 250.

The outer tank 205 may be composed of any type of material. In various embodiments, all or part of the outer tank 205 is transparent. In some embodiments, the outer tank 205 may include different sides or walls of different materials. In one example, the outer tank 205 is composed of poly (methyl methacrylate) (PMMA) or acrylic.

The top of the outer tank 205 may have a length 218 of 52.5 cm. It will be appreciated that the top of the outer tank 205 may have any length. In some embodiments, the top of the outer tank 205 may be covered or partially covered with an optional lid. In some embodiments, the inner tank 250 may be covered or partially covered by a lid that is independent or separate from the lid of the organism tank. Lids are discussed in further detail in FIG. 7A to 7C.

In various embodiments, to fabricate an outer tank 205, materials such as polycarbonate or fluorinated ethylene propylene (FEP) may be used. Materials may be chosen based on their refractive index being close to that of water, such as FEP, such that, once the outer tank 205 is filled with water, the outer tank 205, does not modify the trajectories of the electromagnetic energy traveling through and/or into the water.

The outer tank 205 may be opaque, translucent, or a combination. In some embodiments, to fabricate a partly or fully opaque outer tank 205, materials such as high-density polyethylene (HDPE), polytetrafluoroethylene (PTFE), polyvinyl chloride (PVC), acrylonitrile butadiene styrene (ABS), aluminum, silver, biaxially-orientated polyethylene terephthalate (BoPET), or "Mylar," black paper, or fabric, may be used.

The inner tank 250 may be placed or positioned within the outer tank 205.

The outer tank 205 may hold the inner tank 250. The inner tank 250 may be any shape. In the example in FIGS. 2A and 2B, the inner tank 250 is generally rectangular. The inner tank 250 may also have a slanted side. The slanted side of the inner tank 250 may be substantially parallel or parallel to the slanted side of the inner tank 250 (which may reduce reflections or artifacts by energy, such as a laser, reflected from the mirror associated with the outer tank 205 and transmitted through the inner tank 250). The walls of the inner tank 250 may form a cavity that may hold water and/or aquatic organisms.

In some embodiments, the inner tank 250 may include any number of wells. Each well may hold aquatic organisms or be free of aquatic organisms. Different wells may simulate different environment scenarios. In one example, the inner tank 250 may be divided or partitioned into two different wells. In this example, the first well of the two wells may simulate the environment of a river upstream and the second well may simulate the environment of a river downstream. The river upstream and river downstream environments may be simulated or recreated in a laboratory setting by "daisy-chaining" multiple aquatic monitoring systems 100 together, such that the water or liquid output from a water evacuation assembly of one inner tank 250 may be directed through an input to another inner tank 250 (e.g., through the use of water evacuation systems discussed herein).

In the example of FIG. 2A, the inner tank 250 may include a base plate, side panels, and a back panel. Side panels and the back panel may form three side walls of the inner tank 250. In some embodiments, the side panels of the inner tank 250 and the back panel of the inner tank 250 may be 90°, perpendicular or substantially perpendicular to the base plate of the inner tank 250. The inner tank 250 may include a fourth wall, which may be at an angle to the base plate of the inner tank 250. In one example, the fourth wall of the inner tank 250 may be composed of acrylic or polycarbonate.

The inner tank 250 includes the back panel, side panels, and fourth wall configured such that the inner tank 250 may contain water and/or aquatic organisms. It will be appreciated that the side panels, the back panel, and the fourth wall of the inner tank 250 may each be at any angle relative to the base plate 210.

In various embodiments, the inner tank 250 has dimensions such that it may fit all or in part within the outer tank 205.

The inner tank 250 may be composed of any type of material. In various embodiments, all or part of the inner tank 250 is transparent. In some embodiments, the inner tank 250 may include different sides or walls of different materials. In one example, the inner tank 250 is composed of poly (methyl methacrylate) (PMMA) or acrylic.

In various embodiments, to fabricate an inner tank 250, materials such as polycarbonate or fluorinated ethylene propylene (FEP) may be used. Materials may be chosen based on their refractive index being close to that of water, such as FEP, such that, once the inner tank 250 is filled with water, the inner tank 250, does not modify the trajectories of the electromagnetic energy traveling through and/or into the water.

The inner tank 250 may be opaque, translucent, or a combination. In some embodiments, to fabricate a partly or fully opaque inner tank 250, materials such as high-density polyethylene (HDPE), polytetrafluoroethylene (PTFE), polyvinyl chloride (PVC), acrylonitrile butadiene styrene (ABS), aluminum, silver, biaxially-orientated polyethylene terephthalate (BoPET), or "Mylar," black paper, or fabric, may be used.

In one example, the inner tank 250 is a 2-litre (2 L) aquatic tank manufactured by Aquaneering. Aquatic tanks manufactured by Aquaneering is one of the more popular aquatic tanks used in the United States for the purposes of monitoring aquatic organisms such as the zebrafish.

The top of the inner tank 250 may have any length. In some embodiments, the top of the inner tank 250 is within or may fit within the outer tank 205. In some embodiments, the top of the inner tank 250 may be covered or partially covered with a lid.

A mirror 240 may be disposed on one side of a tank (e.g., either the outer tank 205 or the inner tank 250). The mirror 240 may be positioned such that the reflective surface is directed towards the tank. In various embodiments, energy from an energy source (e.g., light from a light source not depicted in FIG. 2A) may be directed from above the tank(s) and down to the mirror 240 which reflects the energy laterally across the tanks (e.g., thereby illuminating aquatic organisms swimming in the water contained within the inner tank 250). It will be appreciated that the mirror 240 may be on any side of a tank and positioned such that energy may be projected through the inner tank 252 to illuminate all or some of the contents of the inner tank 252.

As used herein, the word "illuminate" refers to making something (e.g., any number of aquatic organisms within the inner tank 250) visible (or enhancing visibility) to one or more image capture device(s). The word "illuminate" may refer to transmitting any energy through all or part of water contained in a tank but does not require the objects/aquatic organisms to be visibly illuminated to the human eye (e.g., the energy source(s) may project any number of wavelengths that are not necessarily visible to the human eye).

The mirror 240 may be attached to the slanted wall of the outer tank 205. In some embodiments, the mirror 240 covers all or part of the slanted wall of the outer tank 205. The mirror 240 may be any mirrored surface. The mirror 240 may be any shape (e.g., round, oval, square, or the like). The mirror 240 may be attached to the slanted wall in any number of ways (e.g., with tape, glue, clips, or the like). In some embodiments, the slanted wall of the outer tank 205 comprises a reflective surface (e.g., either applied to the outer tank 205 or the slanted wall is composed of a reflective material).

In some embodiments, the mirror 240 may be attached to the slanted wall of the inner tank 250 (e.g., when there is no outer tank 205). In some embodiments, the mirror 240 covers all or part of the slanted wall of the inner tank 250.

As discussed herein, the mirror 240 may be any shape (e.g., round, oval, square, or the like). The mirror 240 may be attached to the slanted wall of the inner tank 250 in any number of ways (e.g., with tape, glue, clips, or the like). In some embodiments, the slanted wall of the inner tank 250 comprises a reflective surface (e.g., either applied to the outer tank 205 or the slanted wall is composed of a reflective material).

The water evacuation assembly 260 is optional. The water evacuation assembly 260 of the aquatic monitoring system 200 may be a water output or water outlet of the outer tank 205, allowing water or liquid circulated in the outer tank 205 or the inner tank 250 to be outputted through a water recirculation system. The water recirculation system (not shown) may receive the circulated water and purify the water or liquid (e.g., through methods such as reverse osmosis) to remove contaminants and sediments, such as unconsumed food and/or waste products from the aquatic organisms. The outer tank 205 may include an attachment which allows the water outlet of the water evacuation assembly 260 to be coupled to a water outlet of the inner tank 250. In some embodiments, once the water has been purified, it may be introduced back into the outer tank 205 or inner tank 250 via an input portal on their respective lid.

Figure 2B:
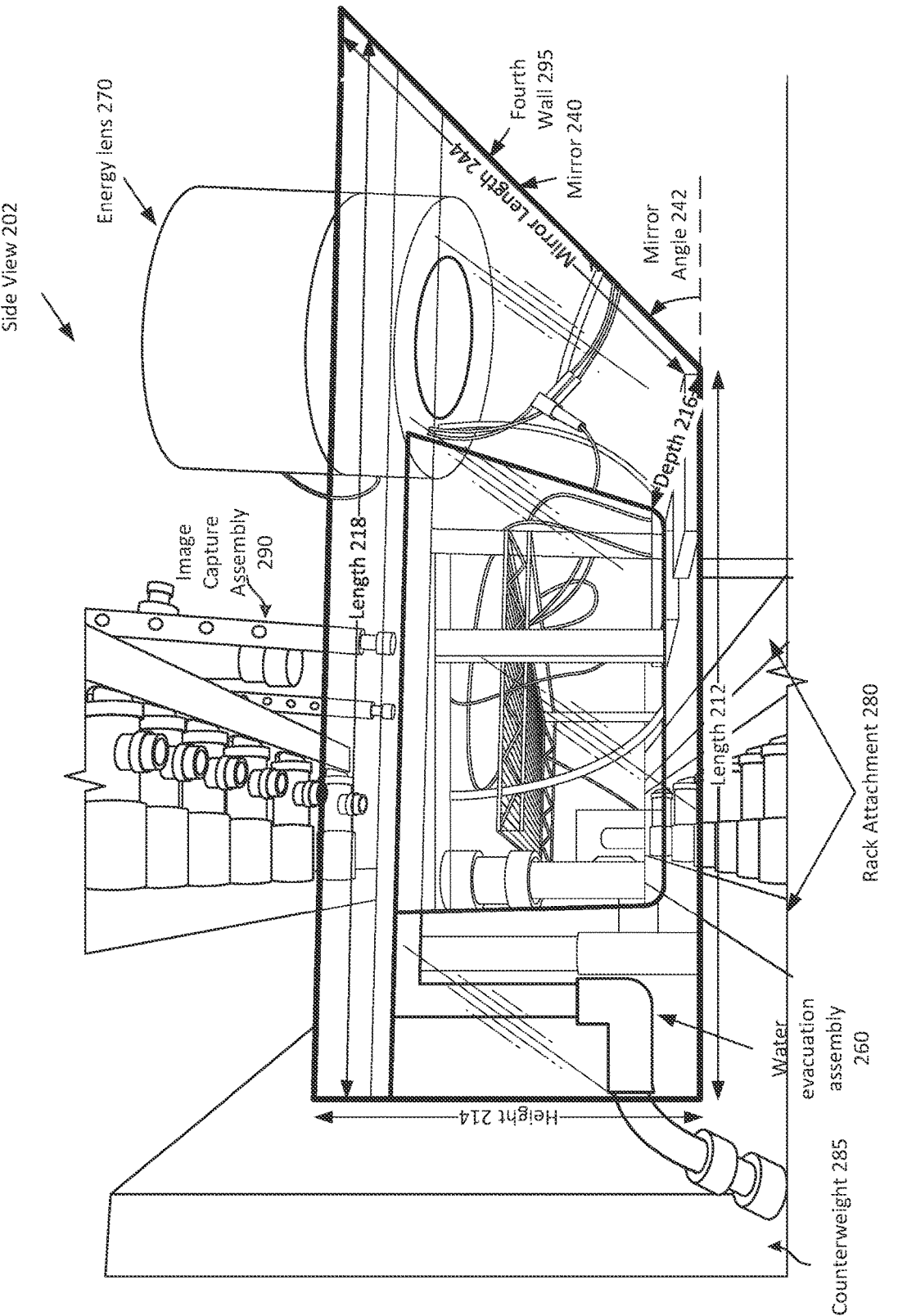
FIG. 2B depicts a side view of the aquatic monitoring system with an outline highlighting the aquatic monitoring system according to some embodiments.

Aquatic organisms within the inner tank 250 may be monitored and imaged by an image capture device (seen in FIG. 2B). A research laboratory may utilize tens, hundreds, or thousands of aquatic organism tanks, such as the inner tank 250. It may not be necessary or practical to monitor and image all of the inner tank 250. A handful of organism tanks or inner tank 250 may be "plugged" into or placed into a setup such as the aquatic monitoring system 200 which includes the outer tank 205, water evacuation assembly 260, and image capture assembly 290 (not shown in FIG. 2A) without disturbing any set up associated with the inner tank 250 and the integrity of any experiments or research being done on the aquatic organisms in the inner tank 250. Further details regarding the inner tank 250 will be discussed in FIG. 5.

FIG. 2B depicts a side view 202 of the aquatic monitoring system 200 with an outline highlighting the aquatic monitoring system according to some embodiments. The aquatic monitoring system 200 of FIG. 2B outlines or highlights some elements of the aquatic monitoring system and depicts elements of the aquatic monitoring system 200 that are not shown or may not be clear in FIG. 2A. For example, FIG. 2B depicts the mirror 240, water evacuation assembly 260, energy lens 270, a rack attachment 280, a counterweight 285, and image capture assembly 290, and a fourth wall 295.

As previously mentioned, the mirror 240 is a reflective surface directed toward the inner tank 250. In some embodiments, the mirror 240 may be adhered or coupled to a fourth wall 295 of the outer tank 205. In some embodiments, mirror 240 may cover all or part of the fourth wall 295 (e.g., both the mirror 240 and the fourth wall 295 have a length 244 of 23.5 cm). As discussed herein, the reflective side of the mirror 240 may face the inside of the outer tank 205.

The energy lens 270 may receive energy, such as a laser, that transmits energy through the energy lens 270 to the mirror 240. The energy is then reflected by the mirror 240 in a direction through the outer tank 205 and the through the inner tank 250. The energy lens 270 may include any number of lenses configured to receive energy (e.g., light) and expand, focus, and/or collimate the energy before providing the energy to the mirror 240. In one example, the energy lens 270 may be or include a PCV lens of −18 mm focal length with a 12 mm diameter and a PCX lens with a 200 mm focal length and a 150 mm diameter. In this example, the distance between a light source (e.g., a diode) and the PCV lens is 19.9 mm and the distance between the PCV to PCX lenses is 180 mm. The exit beam diameter in this example is 145 mm. It will be appreciated that the energy lens 270 may have any kind and number of lenses.

The energy lens 270 may include a beam expander and/or collimator. The expanded beam may be sufficient to illuminate the water column of the inner tank 250 after being reflected by the mirror 240. In one example, the beam expander may be designed to produce a beam which is 12 centimeters (cm) in diameter. Expansion may be accomplished with a magnification of the energy. The energy lens 270 may further include a condenser lens. Further details of the energy lens 270 will be discussed in FIG. 6.

In various embodiments, the energy lens 270 includes an energy source (e.g., a light source or laser source). It will be appreciated that the light source may be any light source, including a laser, a light-emitting diode, or other sources of light. The light source may produce a collimated light source without a lens. In various embodiments, the light source emits light in any wavelength or any number of wavelengths.

The aquatic monitoring system 200 may be placed or positioned on a rack using the rack attachment 280. The rack attachment 280 may support or anchor any number of multiple aquatic monitoring systems 200. In various embodiments, the rack attachment 280 include clips, hooks, or any other retention device that may couple, hook, and/or retain the outer tank 205. The rack attachment 280 may assist from keeping the tank(s) from being jostled or pivot loose based on weight or interaction by personnel (e.g., during feeding, inspection, and/or maintenance).

In some embodiments, the aquatic monitoring system 200 may be placed on a vibration isolation platform to insulate the system from external vibrations. The vibration isolation platform may, for example, be positioned between the outer tank 205 and the rack (e.g., between the outer tank 205 and the rack attachment 280).

A counterbalancing weight, such as the counterweight 285 may hold the load of the aquatic monitoring system 200 and reduce the chances of the aquatic monitoring system 200 from tipping or falling over. It will be appreciated that the weight of equipment, water, mirror 240, and/or the like may make the tank(s) heavy towards the fourth wall and, as a result, there is a possibility that the tank(s) may flip forward off the rack (e.g., when being maintained and/or additional weight is accidentally put on the lid of the tank towards the front). The counterbalance weight and/or the rack attachment 280 may assist in holding the tank(s) in place and/or reducing accidental movement which may upset the aquatic organisms.

The image capture assembly 290 may hold an image capture device (e.g., camera or the like) in a position to maintain all or part of the inner tank 250 within a field of view. The image capture assembly 290 and/or the image capture device may further include an IR bandpass filter.

In the example of FIG. 2B, the image capture device may be positioned by the image capture assembly 290 directly over the inner tank 250. The image capture assembly 290 may include one or more elongated members (e.g., such as rods) capable of being coupled to one or more image capture devices such that the image capture devices are positioned to obtain the desired field of view.

The image capture device may be positioned over a lid that covers the inner tank 250 and/or the outer tank 205. The lid may be transparent to allow image capture device to take images through the lid. In some embodiments, the lid may include cutouts or holes that allow the image capture device to take images through the lid. It will be appreciated that the lid may include a lens to assist in taking images by the image capture device. For example, the lens may include one or more portions (e.g., rectangular portions) positioned such that the image capture device may take images through the lens portions. Alternately, the lid may be or comprise a lens. For example, the lid may assist in magnifying all or part of the inside of the tank(s) to assist in imaging.

In some embodiments, the image capture assembly 290 is supported by a lid that covers the outer tank 205.

The image capture device includes one or more digital camera(s) capable of capturing digital images and/or digital video. In one example, the image capture device is an imaging sensor that captures one or more images of a scene in a snapshot or longer exposure setting in the form of a data stream (an image stream, a pixel stream, byte stream, or the like). Further details of the image capture assembly 290 are discussed in FIG. 7A.

In various embodiments, one or more of the image capture devices (e.g., cameras) may be coupled (e.g., via an ethernet cable or any other couple) with one or more digital devices (e.g., lab computer or other digital device). The one or more digital devices may process and/or provide the images and/or any analysis to a digital device (e.g., on a network or in the cloud as further discussed herein). In some embodiments, any number of the image capture devices may be powered by the ethernet or other cable (e.g., thereby leveraging Power over Ethernet). In some embodiments, a hub may allow the camera, energy source (e.g., light source) and/or heating pads to receive power. In various embodiments, any number of the image capture devices may communicate wirelessly with any number of digital devices (e.g., to provide images, analysis, receive updates, and/or the like).

Figure 3:
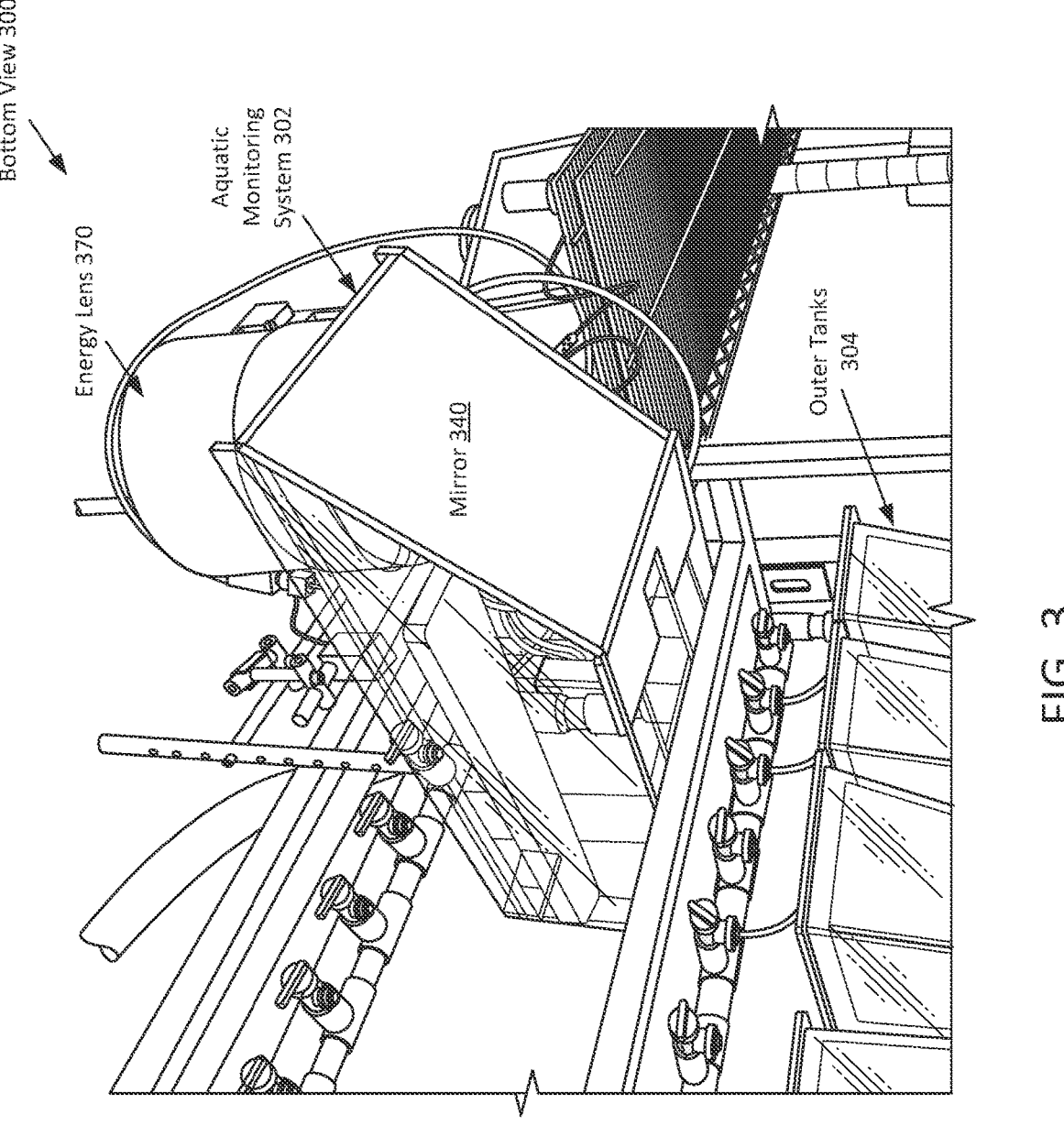
FIG. 3 depicts a bottom view of the aquatic monitoring system according to some embodiments.

The outer tank 205 has a base length 212, a height 214, a top length 218, a depth 216, and a fourth wall length (e.g., mirror length 244). The base length 212 may be shorter than the top length 218 because of the fourth wall 295 being slanted (e.g., at a mirror angle 242 relative to the base of the outer tank 205. FIG. 3 depicts a bottom view 300 of an aquatic monitoring system 302 according to some embodiments. The bottom view 300 provides a clearer view inside an outer tank, a perspective of a mirror 340, and an energy lens 370 of the aquatic monitoring system 302. In some embodiments, the aquatic monitoring system 302 may be the aquatic monitoring system 200.

The inner tank 304 may have specifications that are similar to the inner tank 250 of FIG. 2A. The outer tanks that hold the inner tank may be positioned on rack attachments. A research laboratory facility may utilize tens, hundreds, or thousands of aquatic organism tanks for experimental purposes. A handful of inner tanks, such as the inner tanks 304 positioned within the aquatic monitoring system 302 may monitor and image aquatic organisms.

The energy lens 370 may direct electromagnetic radiation to the inner tank (e.g., by directing the energy to the mirror 340 which reflects the energy through the inner tank). The energy lens 370 may receive electromagnetic radiation from an electromagnetic radiation source. In one example, the electromagnetic radiation is a laser, a light-emitted diode, or other sources of electromagnetic radiation. The electromagnetic radiation and/or energy lens 370 may generate a vertical or substantially vertical beam towards the mirror 340.

The placement of the mirror 340 in the aquatic monitoring system 302 changes the direction of the beam of light (e.g., from vertical to horizontal). The reflected beam may be sufficient to illuminate the water column of the inner tank 250.

In various embodiments, the mirror 340 may not be coupled to or a part of the tank (e.g., mirror 340 is separated from or attached of the outer tank 205 in a different manner). In one example, the mirror 340 may be positioned outside the tank and configured to reflect the energy (e.g., light) through the tank. This may be accomplished through any position as long as the reflective surface of the mirror 340 is directed toward the cavity of the organism tank (e.g., the cavity of the inner tank 250 and/or through the cavity of the outer tank 205). It will be appreciated that although only a single mirror is depicted in FIG. 3, there may be any number of mirrors and the energy from the energy source from the energy lens 370 may be reflected any number of times before being transmitted through the inner tank 250 and/or the outer tank 205.

If will be appreciated that regardless of the position of the mirror 340, the energy source and energy lens 370 must be positioned such that the energy (e.g., light) is reflected by the mirror 340 through the inner tank 250 and/or the outer tank 205.

In some embodiments, the mirror 340 is optional. In one example, the energy source and energy lens 370 is directed such that the energy (e.g., light) is directed through the inner tank 250 and/or the outer tank 205 without being reflected by one or more mirrors.

If the mirror is located outside of the outer tank 205 (e.g., the mirror 340 is not a part of the outer tank 205 and is not coupled to a wall of the outer tank 205), the fourth wall of the outer tank may not be slanted. For example, the fourth wall of the outer tank may be positioned in a manner similar to the other side walls of the outer tank 205. It will be appreciated that the angle of the fourth wall as depicted in FIGS. 2A, 2B, and 3 is predominantly to assist with reflection of the energy from the energy lens 370 by the mirror 340 to transmit the energy through the tank(s). If the mirror 340 is separate from the outer tank 205, the fourth wall may be substantially perpendicular to the base like the side walls. In some embodiments, if the mirror 340 is not a part of the outer tank 205 and is not coupled to a wall of the outer tank 205, then there may not be an outer tank 205 and there may only be an inner tank 250 (e.g., an organism tank) holding the aquatic organisms. For ease of reference, if there is not an outer tank 205 (as in some embodiments), the inner tank 250 is still referred to herein as an "inner tank 250" even though the inner tank 250 may not be within a larger tank.

In some embodiments, the cavity of the tank (e.g., inner tank 250) may be illuminated by two or more energy beams. In one example, an energy beam (e.g., light) may be reflected from a mirror in one direction across the cavity of the tank and another energy beam may be reflected from another mirror (e.g., located apart from the tank) in another direction across the cavity. Multiple energy beams may assist in determining position of the aquatic organisms in the tank (e.g., 3D positions). The image capture device may use the information gathered from the multiple energy beams to assist in determining position (e.g., with or without images) of the aquatic organisms. In some embodiments, a digital device may receive the images from the image capture device(s) and use the images to assist in determining a 3D position.

In various embodiments, a LiDAR or other depth sensing device may be used to determine position of the aquatic organisms within the tank. A digital device may receive the images from the image capture device (e.g., based on illuminating the aquatic organisms with one or more energy beams) as well as the sensor results from the LiDAR (or other sensor measurements) to correlate position with behavior.

Figure 4:
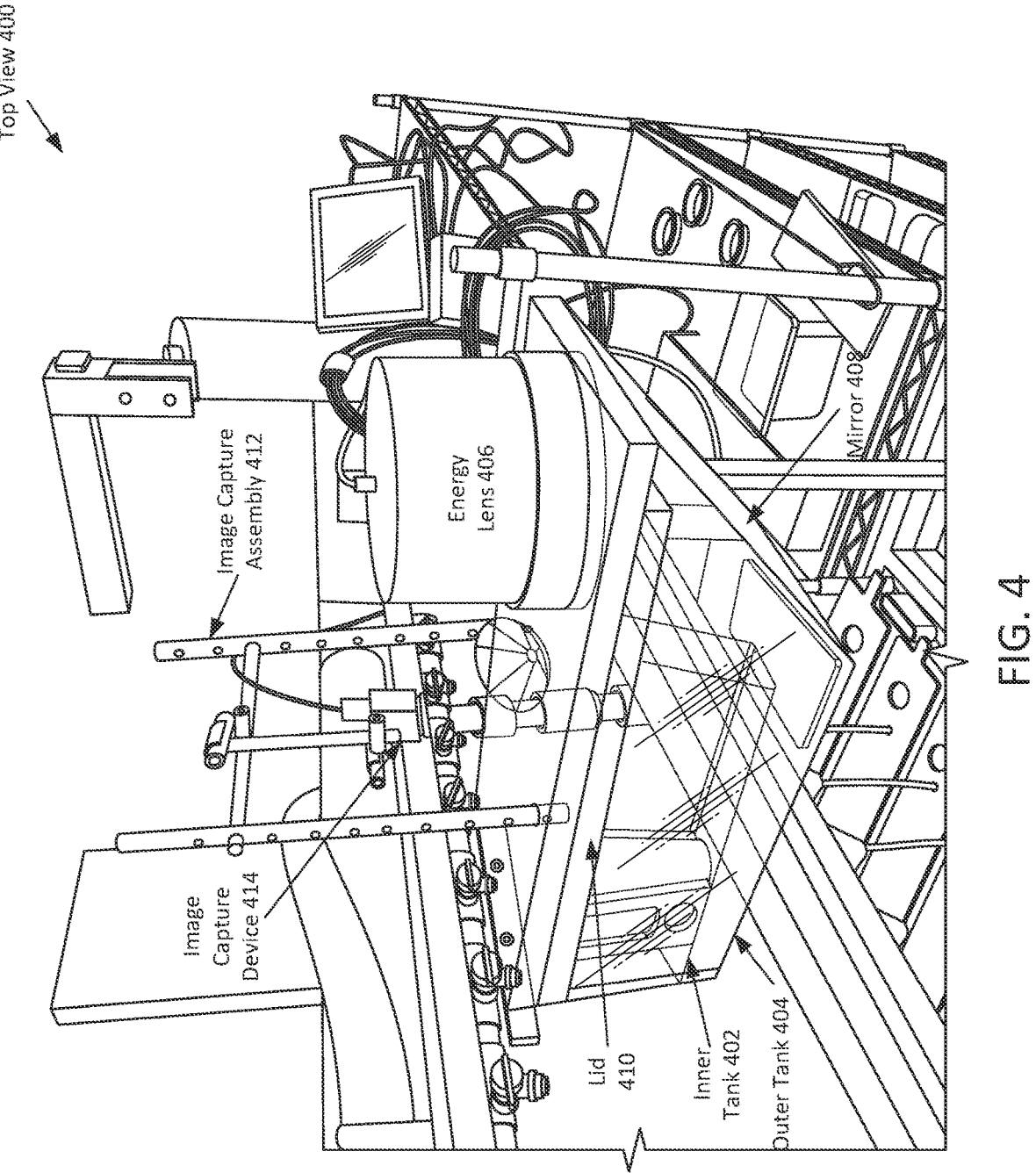
FIG. 4 depicts a top view of the aquatic monitoring system according to some embodiments.

FIG. 4 depicts a top view 400 of the aquatic monitoring system according to some embodiments. The top view 400 provides a clearer view of some components of the aquatic monitoring system 302 such as the energy lens 370. The outer tank and the inner tank is visible in FIG. 4. Further, the image capture assembly is depicted as being supported by a lid of the tank.

FIG. 4 includes an inner tank 402, outer tank 404, energy lens 406, mirror 408, lid 410, image capture assembly 412, and image capture device 414. The inner tank 402 may be similar to inner tank 250 discussed with regard to FIG. 2A. The outer tank 404 may be similar to outer tank 205 discussed with regard to FIG. 2A. Energy lens 406 may be similar to energy lens 270 discussed with regard to FIG. 2A. Mirror 408 may be similar to mirror 240 discussed with regard to FIG. 2A. The image capture assembly 412 may be similar to image capture assembly 290 discussed with regard to FIG. 2A.

As discussed herein, lid 410 may cover all or part of the outer tank 404. In this example, the lid 410 supports the image capture assembly 412. The image capture assembly 412 supports and positions the image capture device 414 such that the field of view of the image capture device 414 is directed towards the contents of the inner tank 402. The image capture device 414 may include any number of image capture sensors (e.g., camera sensors).

Each image capture device of each tank in the rack may provide images and/or video to a centralized digital device or into the cloud for analysis.

Figure 5:
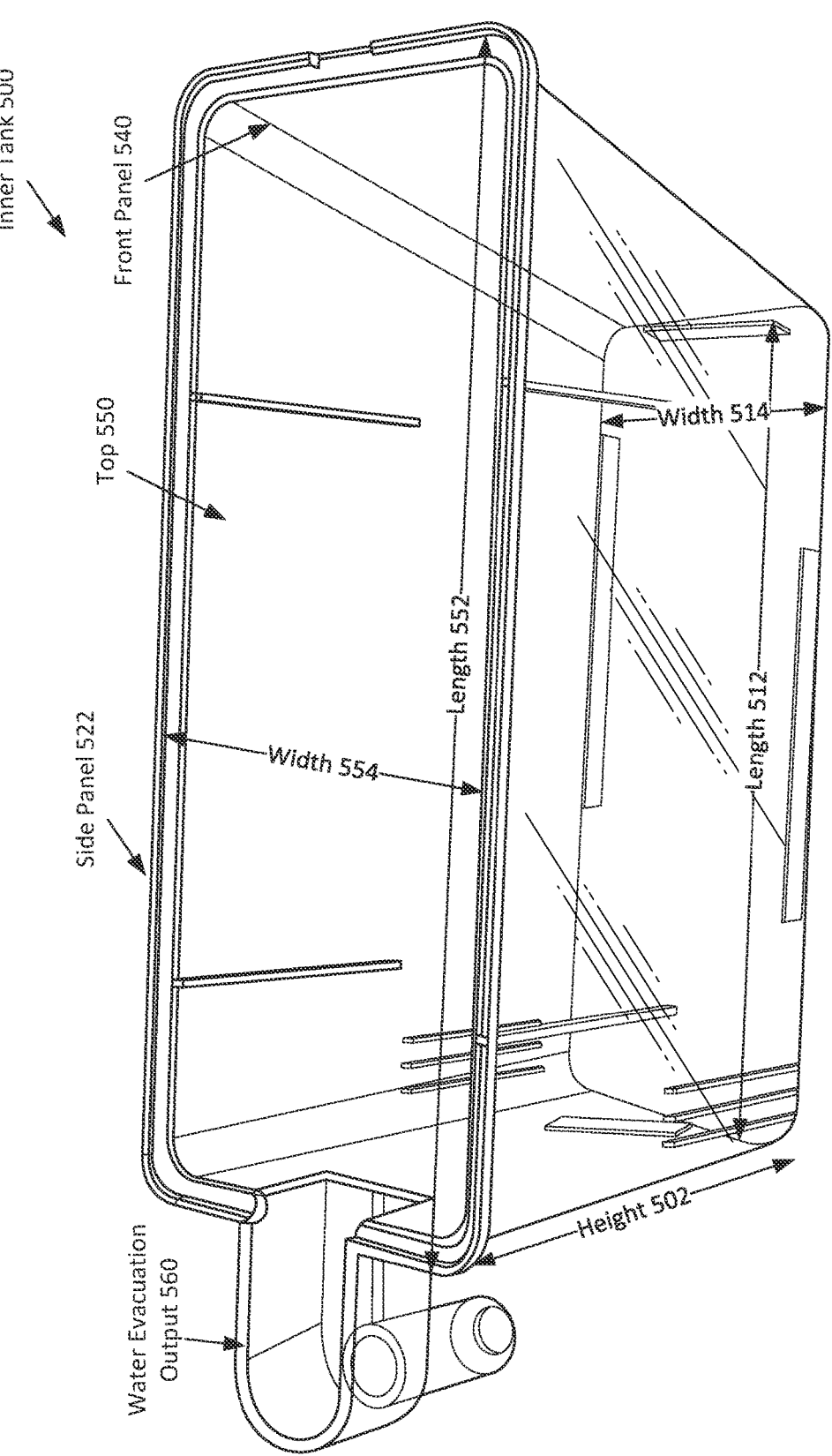
FIG. 5 depicts a view of an inner tank of the aquatic monitoring system according to some embodiments.

FIG. 5 depicts a view of an inner tank 500 of the aquatic monitoring system according to some embodiments. The inner tank 500 includes a base plate 510, side panels 520 and 522, a back panel 530, a front panel 540, a top 550, and a water evacuation output 560.

The side panels 520 and 522, the back panel 530, and the front panel 540 form four side walls of the inner tank 500. In some embodiments, the side panels 520 and 522 and the back panel 530 may be perpendicular or substantially perpendicular to the base plate 510. In some embodiments, the front panel 540 may be positioned at an angle to the base plate 510. In some embodiments, the inner tank 500 may be a 2-liter (2 L) aquatic tank manufactured by Aquaneering. The inner tank 500 may include a water column height of 12 cm.

In various embodiments, the inner tank 500 may be manufactured by companies such as Tecniplast or Iwaki.

The water evacuation output 560 may be positioned on or near the back panel 530. Water may be outputted from the inner tank 500 using the water evacuation output 560.

In one example, the inner tank 500 is a standalone system (e.g., the inner tank 500 is not placed within the outer tank 205 but is used for imaging and illuminating aquatic organisms). The water evacuation output 560 may be coupled to the water recirculation system. The water recirculation system may receive the circulated water and purify the water or liquid through methods such as reverse osmosis to remove contaminants and sediments, such as unconsumed food or waste products.

In some embodiments, as discussed herein, the inner tank 500 may be placed inside an outer tank, such as the outer tank 205 of FIG. 2A, in which case the water evacuation output 560 may be coupled to a water evacuation assembly. The water evacuation assembly, in turn may be coupled to the water recirculation system.

In some embodiments, the base plate 510 of the 500 has a length 512 of 22 cm, and a width 514 of 8 cm. The top 550 has a length 552 of 27 cm and a width 554 of 10 cm. In one example, inner tank 500 has a height 502 of 14 cm. it will be appreciated that the base plate 510, with 514, length 552, and with 554 may have any dimensions as long as the inner tank 500 is capable of holding water and aquatic organisms.

It can be appreciated that the inner tank 500 can have a size that is larger than nor smaller than the inner tank 500 of FIG. 5.

Figure 6:
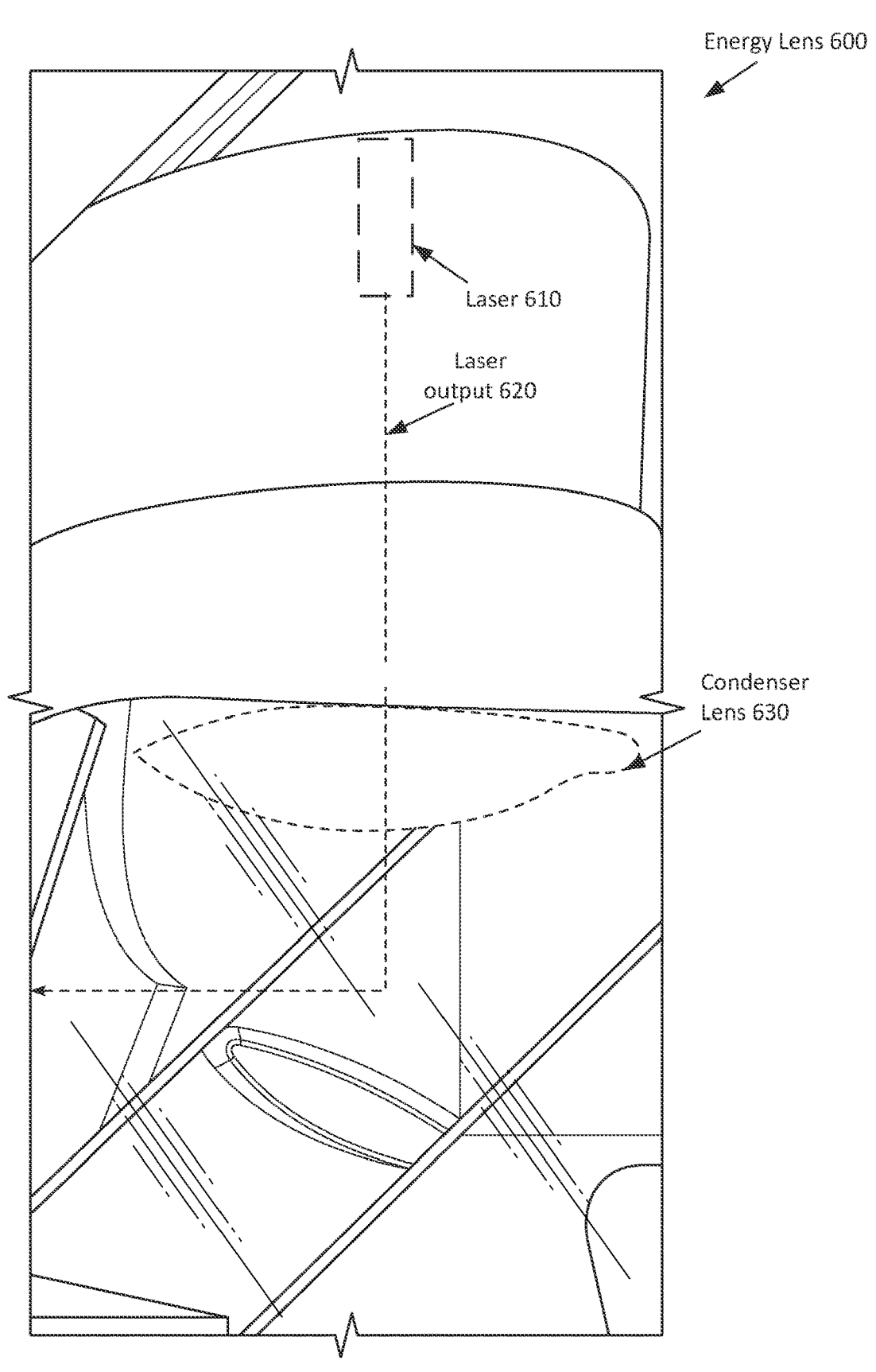
FIG. 6 depicts an energy lens of the aquatic monitoring system according to some embodiments.

FIG. 6 depicts an energy lens 600 of the aquatic monitoring system according to some embodiments. The energy lens 600 optionally includes an energy source such as the laser 610 which outputs energy (e.g., a laser) through output 620.

The energy lens 600 optionally includes an energy source such as the laser 610 which, in this example, is enclosed inside an outer container of the energy lens 600. In some embodiments, the laser 610 is a laser that generates a beam of light that travels along the illumination light path. In some embodiments, the laser 610 provides illumination from a narrow spectrum, coherent, NIR light source. For example, the primary light source may emit light with a wavelength between 808 to 810 nanometer (nm), 850 nm, or 975 nm. It will be appreciated that there may be any light source(s) (in addition to or instead of the laser 610) including, for example, a laser, a light-emitting diode, or other sources of light. The output energy (e.g., light or laser) may be collimated by the energy source and/or may be collimated using a lens. In various embodiments, the energy source emits light in any number of wavelengths.

In this example, the laser 610 may be pointed downward and expanded by mirrors of the energy lens 600. An output 620 of the laser 610, transmits the light beam to one or more mirrors of the energy lens 600 (not shown) to expand the output 620 of the laser 610. In some embodiments, a condenser lens 630 of the energy lens 600 may be designed to produce a beam of a desired size (e.g., 12 centimeters in diameter). This may be accomplished with a magnification of the transmitted energy. For example, the condenser lens 630 may be used. In one example, the condenser lens has a diameter of 150 millimeters (mm).

The condenser lens (or all of part of the energy lens 600) may be submerged into the water or liquid in the inner tank. The submersion of the lens into the water may allow the collimated rays from the light source to cover the whole water column of the inner water tank and may further increase the magnification of the beam expander. In other embodiments, the energy lens 600 may not be submerged in the water or liquid (e.g., the energy lens 600 is positioned above the water or liquid).

In some embodiments, the lens condenser lens is a planoconcave lens. In some embodiments, the lens condenser is a biconcave lens. In various embodiments, the beam expander is a Galilean-type beam expander and includes a laser alignment module, a plano-concave or biconcave lens, and the condenser lens. The laser may provide an elliptical beam. In some embodiments, the energy lens 600 includes a diaphragm which may be utilized to clip, circularize, or make rectangular the output of the laser 610.

Figure 7A:
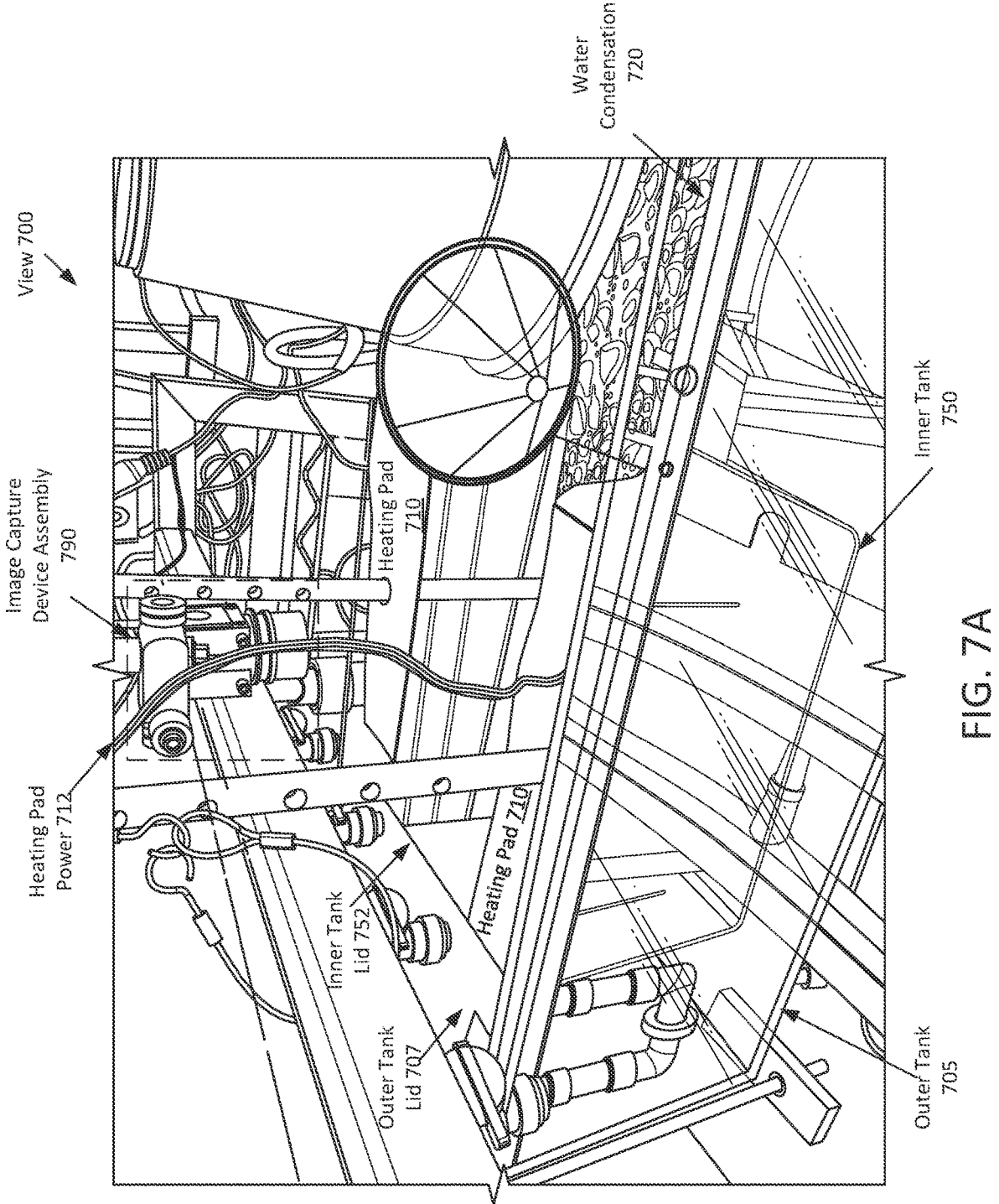
FIG. 7A depicts a view including lids of the aquatic monitoring system according to some embodiments.

FIG. 7A depicts a view 700, including lids of the aquatic monitoring system to some embodiments. The view 700 includes an outer tank 705 and an inner tank 750, which may be similar to the outer tank 205 and the inner tank 250 depicted in FIG. 2A.

FIG. 7A includes the outer tank 705 and the inner tank 750 and their respective lids (e.g., including an outer tank lid 706 and an inner tank lid 752). In other embodiments, the aquatic monitoring system includes only one lid (e.g., either the outer tank lid 706 or the inner tank lid 752).

One or both of the outer tank lid 706 and inner tank lid 752 may include one or more holes or access portals for purposes of feeding the aquatic organisms inside the inner tank 750 and/or allowing for images to be taken from the image capture device(s) above the inner tank 750. The outer tank lid 706 and the inner tank lid 752 may be composed of PPMA or acrylic, polycarbonate or fluorinated ethylene propylene (FEP).

In one example, the outer tank lid 706 may include optional heating pads 710 to reduce or eliminate condensation collecting on the inside and/or outside of the lid(s). In one example, the heating pads 710 may be placed on the outer perimeter of the outer tank lid 706 proximate to the inner tank lid 752. More details regarding the placement of the heating pads 710 are discussed in FIG. 7B.

As discussed herein, the heating pads may reduce or eliminate the occurrence of water condensation on the outer tank lid 706 in the region of the field of view of a image capture assembly 790 of the aquatic monitoring system. In some embodiments, a small electrical charge may be sent through any number of heating pad(s) to heat the area of the outer tank lid 706 connected to heating pads 710 and an area of the outer tank lid 706 and the inner tank lid 752. The heating pad(s) may warm a surface of the inner tank lid 752 which may reduce or prevent the formation of condensation which may otherwise form on the inner tank lid 752. By removing the water condensation on the inner tank lid 752, the image capture assembly 790 may be able to capture digital images and video without water condensation artifacts.

In some embodiments, the outer tank or inner tank may include one or more wipers (not depicted). The wipers may remove algae that form on the walls or base. In some embodiments, the wipers are manual. In various embodiments, one or more wipers are powered coupled to a part of the tank to assist with automated or powered cleaning of algae (or cleaning to remove nucleation sites that may allow algae to grow).

The image capture assembly 790 may include an image capture device or may be a structure to support or position image capture device(s). In some embodiments, the image capture device may include a digital camera capable of capturing digital images and digital video.

The aquatic monitoring system and/or a digital device may receive a data stream captured by sensors, extract motion information from the data stream, and store the data via a storage component. The storage component may store images, information extracted from the images, and other data generated by the image capture device. The aquatic monitoring system may access the storage and an optional display via a network and/or locally. The image capture device may capture digital images and videos from a vertical point of view. For example, the image capture device may be supported and is placed directly above or below the organism tank.

In some embodiments, the system creates darkfield illumination conditions and allows aquatic organisms in the organism tank to receive visible incident light. The aquatic monitoring system may illuminate the aquatic organisms with a horizontal light field from a narrow band, near-infrared (NIR) light source.

The image capture device assembly may include an optional narrow bandpass filter or longpass filter coupled to the image capture device. In some embodiments, the narrow bandpass filter may be unnecessary when visible light is not present. In various embodiments, the optional narrow bandpass filter may be removed when no visible light is present (e.g., at night). The image capture device may have any focal length. In one example, the focal length of the image capture device's objectivity is 3.6 mm. A neutral density filter may be optionally fitted to the image capture device to allow recording long exposure images without saturation.

In some embodiments, wavelengths outside the NIR spectrum may be filtered out by using NIR opaque or NIR absorbing materials to fabricate the organism tank. In some embodiments, the intensity of the darkfield illumination may be increased to dominate stray ambient NIR.

Figure 7B:
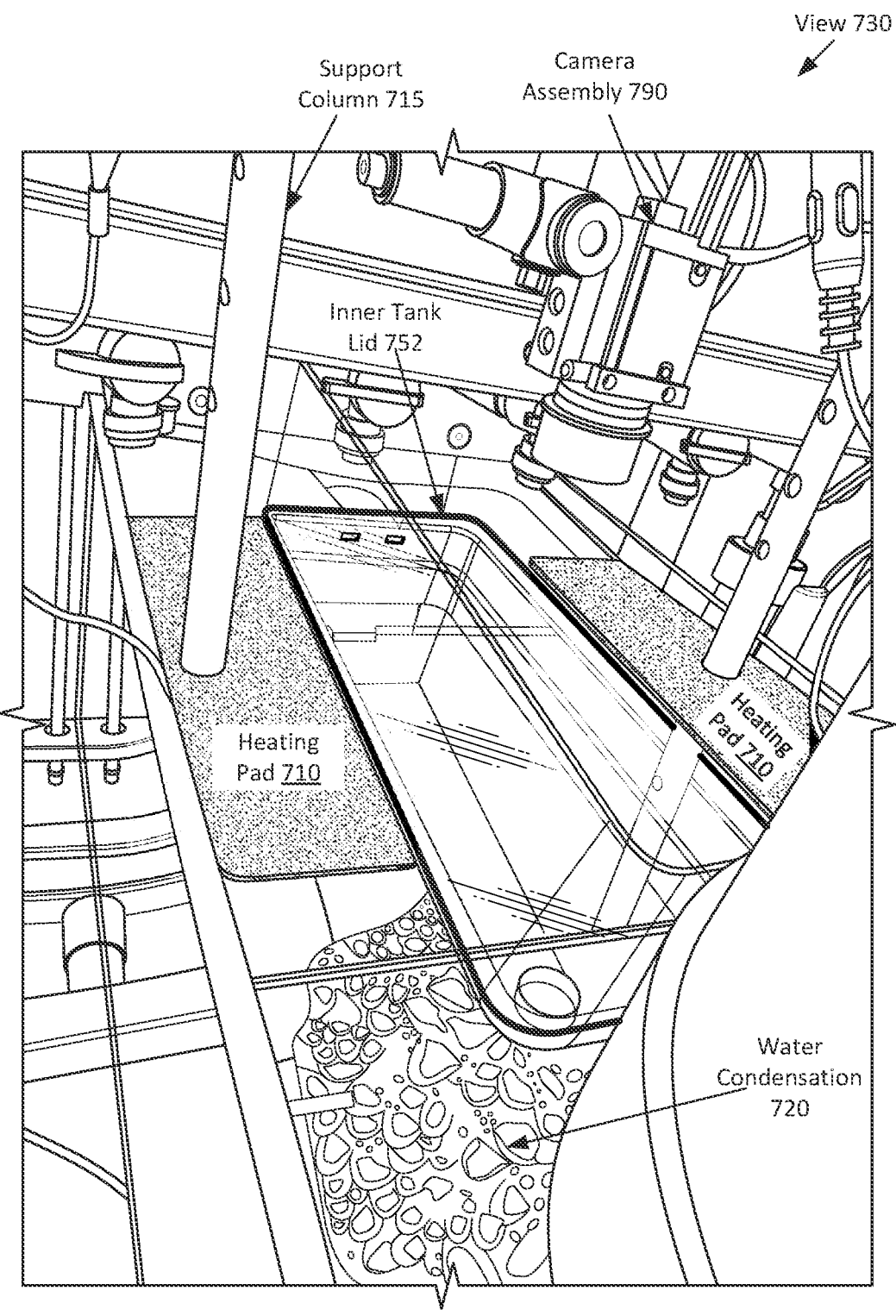
FIG. 7B depicts another view of the lid of the aquatic monitoring system with heating pads according to some embodiments.

FIG. 7B depicts another view 730 of the lid of the aquatic monitoring system with heating pads according to some embodiments. The view 730 shows the relative locations between the heating pads 710 and the inner tank lid 752. As depicted in FIG. 7B, the heating pads 710 reduces the occurrence of water condensation in the area of the inner tank lid 752 in and around the field of view of the image capture assembly 790.

The view 730 further includes support column 715. The support column 715 may provide structure support for image capture device(s) and/or parts of the aquatic monitoring systems. In some embodiments, the support column 715 provides a mechanism to organize power cables and the like that runs between the different shelves of the racks.

In some embodiments, the power cables associated with the heating pad 710 may run along the support column 715.

Figure 7C:
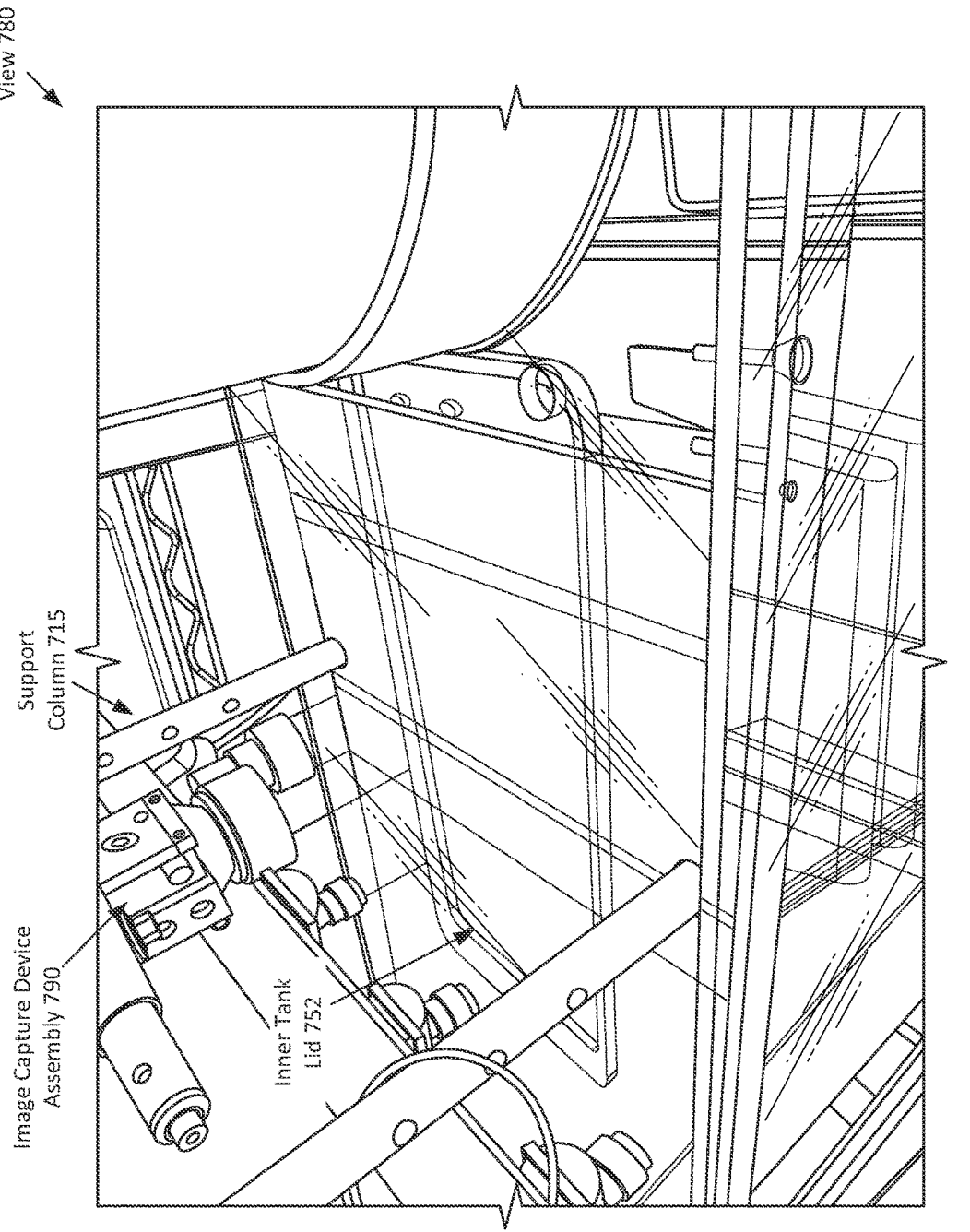
FIG. 7C depicts a view of a lid of the aquatic monitoring system according to some embodiments.

FIG. 7C depicts a view 780 of a lid of the aquatic monitoring system according to some embodiments. The view 780 provides another view of the aquatic monitoring system and its components including the support column 715, inner tank lid 752, and the image capture device assembly 790.

FIG. 8 depicts a side view 800 of an inner tank 850 of the aquatic monitoring system according to some embodiments. In one example, the inner tank 850 is a 2-litre (2 L) aquatic tanks manufactured by Aquaneering. End baffles 810 may be placed in the inner tank 850 to adjust the water volume (e.g., or control movement of the aquatic organisms to be in the field of view of the image capture device). In some embodiments, the placement position of the end baffles 810 may depend on many factors including a minimum camera-to-water and the focal length of the image capture assembly. The camera-to-water distance may be measured as a distance between a water level 820 of the inner tank 850 to the lens of an image capture device of a image capture device assembly 890. Furthermore, the placement of the baffles may allow a technician to adjust the water volume of the inner tank 850 without moving or transferring the aquatic organisms from one tank to another.

Although end baffles 810 are depicted in FIG. 8, it will be appreciated that there may be only one end baffle 810 or any number of end baffles 810. In some embodiments, the end baffles 810 are positioned such that they are proximate to but outside of a field-of-view of an image capture device supported by the image capture device assembly 890.

The end baffles 810 may be composed of PPMA or acrylic, polycarbonate or fluorinated ethylene propylene (FEP). The end baffles 810 may be composed of a material (e.g., such as that above) that reduces or eliminates reflections that may cause artifacts in captured images. In various embodiments, the end baffles 810 are positioned such that there is little or no reflection caused by ambient light or light transmitted through the inner tank 850 by a light source.

Sometimes it may be necessary to change the configuration of the inner tank such as water volume or specifications of the camera assembly, such as the field of view or focal length. For example, if the subject of an experiment includes smaller aquatic organisms or raising aquatic organisms from eggs, the water volume required for the experiment may be reduced. To reduce the water volume smaller tanks may be used or end baffles 810 may be added or repositioned within a single tank to assist with image capture. However, as the aquatic organisms grow and become larger, the water volume required may increase. In this example, end baffles 810 may be removed or repositioned to assist with image capture. Adding or repositioning end baffles 810 may eliminate the need to move the aquatic animals from one tank to another which may disrupt health and cause stress.

Figure 9:
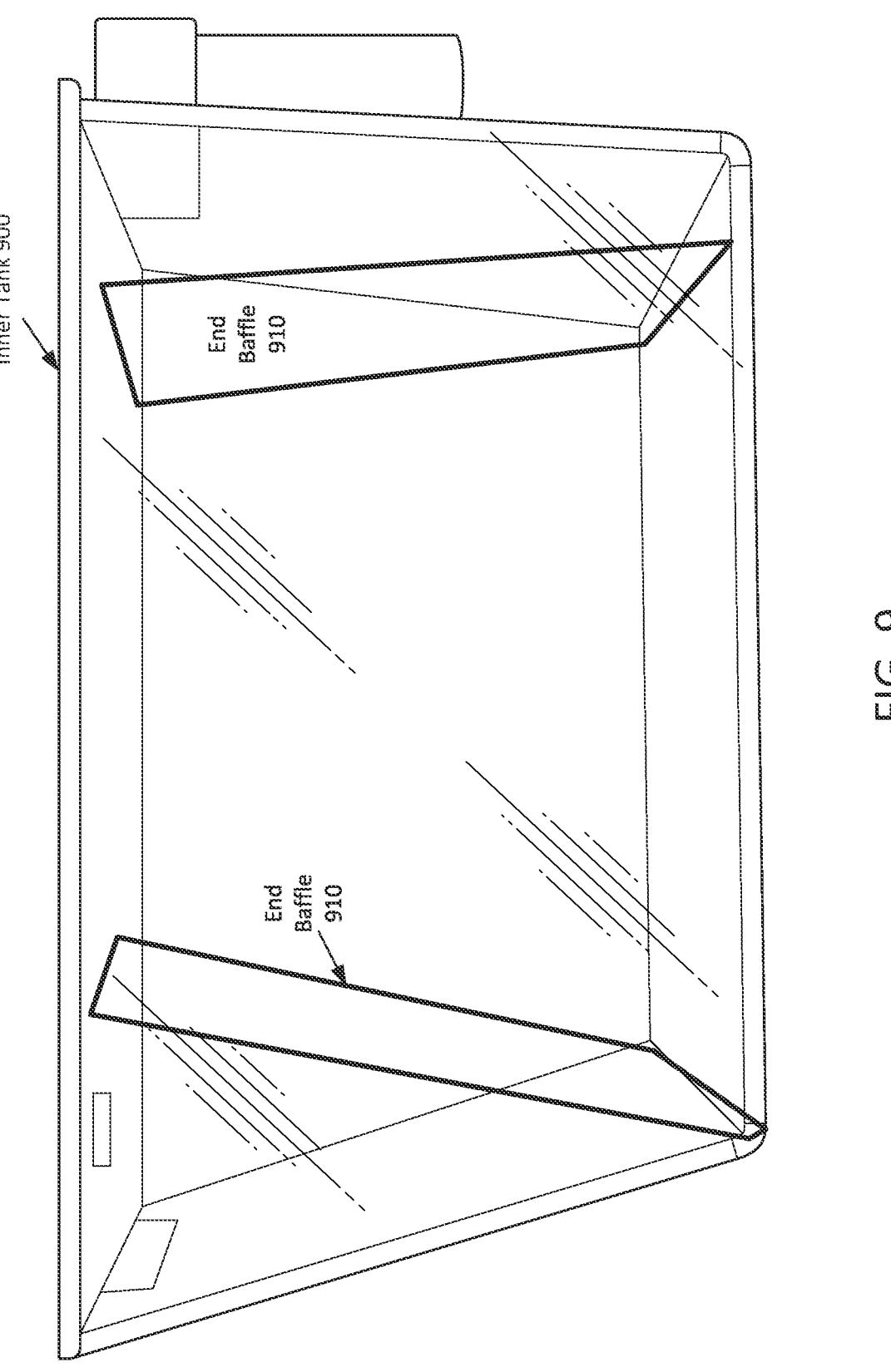
FIG. 9 depicts a side view of another inner tank of the aquatic monitoring system with devices to restrain the flow of liquid in the inner tank according to some embodiments.

FIG. 9 depicts a side view of another inner tank 900 of the aquatic monitoring system with devices according to some embodiments. The inner tank 900 may be an 8L organism tank manufactured by Aquaneering. Similar to the tank of FIG. 8, the water volume of the inner tank 900 may be adjusted by changing the position of the placement of end baffles 910. The end baffles 910 may be placed on opposite sides of the inner tank 900.

Figure 10:
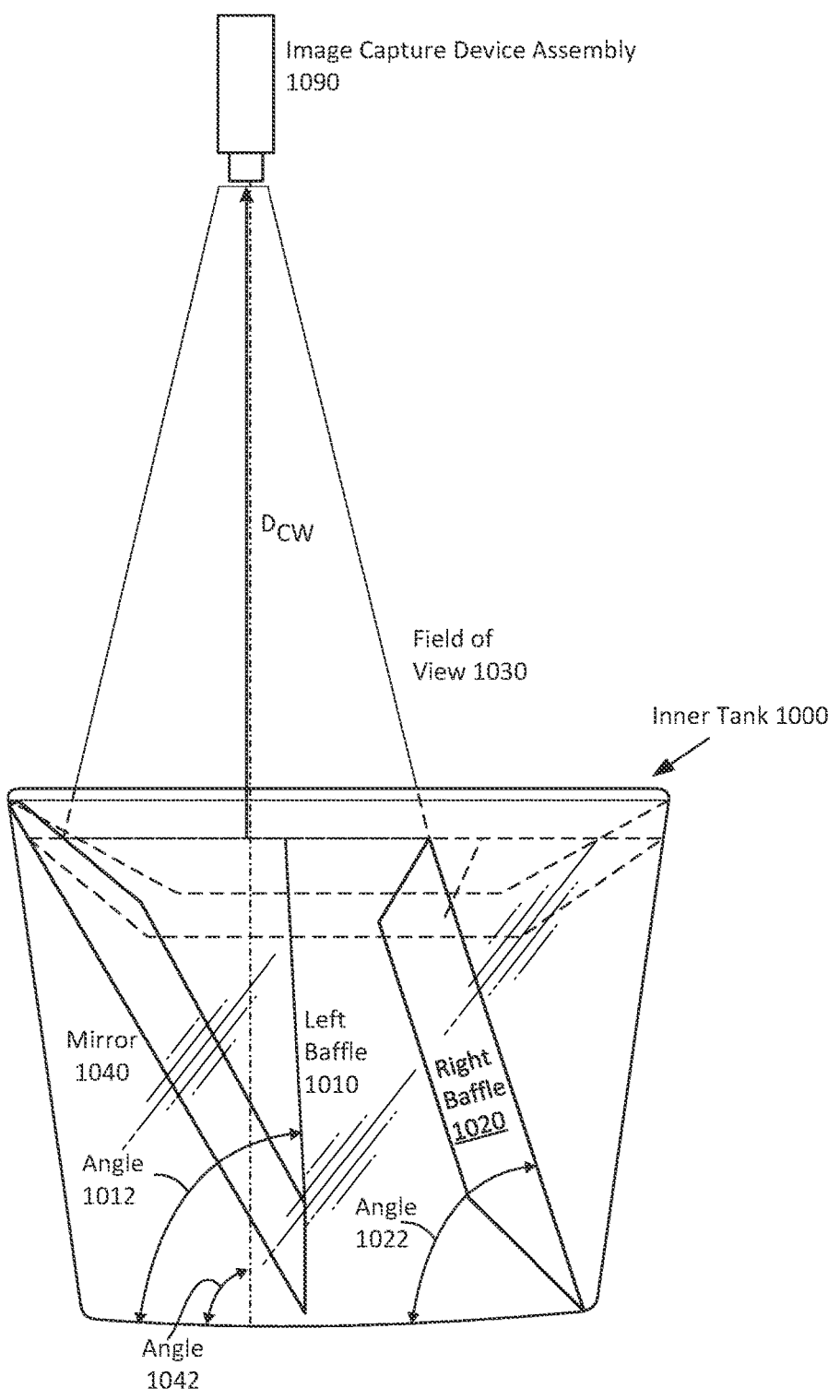
FIG. 10 depicts a side view of yet another inner tank of the aquatic monitoring system with devices to restrain the flow of liquid in the inner tank according to some embodiments.

FIG. 10 depicts a side view of yet another inner tank 1000 of the aquatic monitoring system with devices to restrain the flow of liquid in the inner tank according to some embodiments. A mirror 1040 may be placed at an angle 1042 relative to the base of the inner tank 1000. In this example, the mirror 1040 may be coupled to a baffle or the baffle may include a reflective surface (e.g., the baffle may be the mirror). The mirror 1040 may be positioned such that the mirror 1040 may direct light across the inner tank 1000 to illuminate the aquatic organisms.

The angle 1042 may be any angle. In one example, the angle 1042 is 45°. An optional left baffle 1010 may be positioned on the left side of the inner tank 1000. The left baffle 1010 may be placed at an angle 1012 to constrain the movement of the aquatic organisms between the left baffle 1010 and the right baffle 1020. The left baffle 1010 may have any angle relative to the base of the inner tank 1000. In one example, the angle 1012 of the left baffle is substantially perpendicular or 90°. An optional right baffle 1020 may be positioned on the right side of the inner tank 1000. The right baffle 1020 may have any angle relative to the base of the inner tank 1000. In one example, the right baffle 1020 may be placed at an angle 1022 that is substantially perpendicular or 90°.

For simplicity, FIG. 10 is not drawn to scale, the left baffle 1010 and the right baffle 1020 do not line up with a field of view 1030 of the image capture device (not shown) of the camera assembly 1090 as shown in FIG. 10. The baffles may diverge from the field of view 1030 because light rays refract at the air-water boundary at the water level of the inner tank 1000.

In some embodiments, the image capture device is a digital camera capable of capturing digital images and/or digital video. The image capture device is an imaging sensor that captures one or more images of a scene in a snapshot or longer exposure setting in the form of a data stream (an image stream, a pixel stream, byte stream, or the like). The image capture device may be driven by the primary control system. In some embodiments, one or more of the image capture devices is positioned below or substantially below one of the organism tanks.

Remanent images may be taken from a top-down view of an inner tank of the aquatic monitoring system. Remanent images may capture the movement of aquatic organisms in the inner tank. In some embodiments, remanent images may be grey-scaled images, where a lighter (e.g., whiter) area of the remanent image corresponds to increased movement in the water or liquid of the inner tank. Remanent images are further discussed herein.

In one example, analysis of the remanent image may indicate an increase of movement in a particular part of the tank during certain events (e.g., a feeding time). Remanent images may be used, for example, to detect movement of the fish at a certain part of the tank. Further analysis or examination may reveal that the fish became more active (as shown by the remanent images) when food, in the form of Artemia or brine shrimp, is introduced to a particular part of the tank. In another example, analysis of the remanent images may indicate the aquatic organisms' behavioral response to sudden events (e.g., darkness). Anxiety may drive the aquatic organisms to a bottom of the tank which may be detected through the remanent images. Remanent imaging, including the process of analysis, is further discussed with regard to U.S. Pat. No. 10,805,538, titled "Method and Apparatus for Remanent Imaging Control" which is incorporated by reference herein.

An image capture device of the image capture device assembly may support a remanent imaging mode. In remanent imaging mode, for example, for a given frame rate, a sensor may be configured to record in global shutter mode (e.g., as opposed to a sensor recording in rolling) with an exposure time of a value that results in recording consecutive frames with a negligible inter-frame time interval. This may be achieved by setting the sensor exposure time to the longest value consistent with the frame rate; for example, when recording at 30 fps, each image in a remanent imaging sequence would be exposed at 1/30 s. In practice, the sensor of a video capture device needs some time to refresh between each exposure. For a given video capture device, the remanent exposure of that capture device at a given frame rate is defined as the longest exposure time that the capture device can support at that frame rate and produce a new image at each frame cycle; a capture device capturing at "remanent exposure" is said to operate in Remanent Imaging mode.

For a capture device supporting four frame rates ranging from 3.75 fps to 30 fps, typical examples of remanent imaging exposures might be 0.266 s at 3.75 fps, 0.133 s at 7.5 fps, 0.066 s at 15 fps, and 0.033 s at 30 fps. More generally, one may consider that a camera is operating in remanent imaging mode if it captures consecutive full frames (e.g., the camera operating in global shutter mode) with an amount of uncaptured interframe time no longer than the time required by the camera sensor to refresh.

In various embodiments, the image capture device may capture one or more images of a scene in remanent imaging mode in the form of a data stream (an image stream, a pixel stream, byte stream, or the like). In many circumstances, remanent images are produced with exposure times that result in motion blur. In snapshot imaging, by contrast, exposure time is generally short enough to prevent such blur. The maximum duration of the exposure time may be determined by the speed of the fastest moving objects in the scene. Remanent Images result from the mathematical integration of the luminous power irradiating the sensor plane during the exposure interval. As the power irradiating the source originates from the power radiated by scene components, an image can also be interpreted as the projection on the sensor plane of the power radiated by scene components integrated over the exposure interval. As scene components move during the exposure time along the field lines of their velocity fields, images can also be interpreted as the projection of the velocity field resulting from integrating a time-varying velocity field over the exposure interval. Consistent with this interpretation, motion data can be extracted, not by the usual numerical processing performed on a sequence of snapshots, but by morphological algorithms and other algorithms capable of handling abstract mathematical objects; this type of processing is often referred to as symbolic processing. Remanent imaging algorithms are fundamentally different from all other motion extraction algorithms used in Snapshot Imaging as they work on a single image at a time; such image can be a native output of a camera or synthetically created by processing an image sequence. By nature, no sampling-based motion extraction algorithm can infer motion from a single time sample without being provided extraneous information.

In some embodiments, properly-rounded integer multiples of the remanent exposure can be used to approximate remanent imaging at a lower frame rate than the capture frame rate (or at frame rates not natively supported by the capture device), to reduce the amount of unexposed, interframe time. For example, for a sensor capturing at 60 fps, exposure durations of 0.066 s and 0.099 s could be used instead of the 0.016 s remanent exposure at 60 fps, though the select embodiments do not limit this. At 60 fps, an exposure time of 0.016 s may result in 0.04 s left unexposed every second, while using 0.066 s (the remanent exposure at 30 fps) or 0.099 s (the remanent exposure at 20 fps) may leave unexposed only 0.02 s every second. In some embodiments, operating frame rates of image capture devices should be understood as not necessarily dictating the usable exposure time.

In various embodiments, a tank with an image capture device, an energy source, and two mirrors may be used to record aquatic animals in an XYZ coordinate system. In one example, the energy beam (e.g., light) is coming from a direction that is orthogonal to the plane of FIG. 10. A first mirror (not depicted) may reflect the energy beam through all or part of the cavity formed by the inner tank 1000. A first portion of a sensor of the image capture device 1090 may capture, in the XY plane, images and/or video in a manner described herein. The second mirror 1040 may capture energy (e.g., light) reflected by one or more of the aquatic organisms. The second mirror may be positioned such that a second portion of the sensor of the same image capture device 1090 captures the light reflected from the one or more of the aquatic organisms (e.g., in the Z plane).

In this example, there are at least two different portions of the sensor(s) of the image capture device that are capturing different information regarding the aquatic organisms (in an XYZ coordinate system potentially at the same time). It will be appreciated that the second mirror may not reflect any input light directly into the sensor of the image capture device. In this manner, the system may obtain the individual position of one or more of the aquatic organisms.

In this example, the second mirror 1040 may be within or outside the inner tank 1000. The second mirror 1040 may be positioned along one of the two tank walls of the inner tank 1000 parallel to the incoming energy beam (assuming there are four walls, however the inner tank 1000 may have any number of walls and the second mirror 1040 may be positioned in a manner parallel to the input energy beam). In one example, the second mirror 1040 may be positioned along that wall so that it is parallel to it in the horizontal direction and forms a 45° angle with it in the vertical direction.

Although the mirror 1040 is depicted as being within the inner tank 1000, it will be appreciated that the mirror 1040 may not be within or a part of inner tank 1000. Further, as discussed herein, although FIG. 10 refers to the "inner tank 1000," it will be appreciated that the inner tank 1000 may not be inside a larger tank or inside any apparatus (e.g., the inner tank 1000 may be the only tank).

In various embodiments, a tank with an image capture device 1090, an energy source, and only one mirror may be used to record aquatic organisms in X, Y, and Z planes. In this example, the energy beam (e.g., light) is transmitted in a direction that is orthogonal to the plane of FIG. 10 without using the first mirror (e.g., the energy beam is transmitted directly through all or part of the cavity formed by the inner tank 1000). As discussed above, the second portion of a sensor of the image capture device 1090 may receive energy (e.g., light) reflected by one or more of the aquatic organisms via the mirror 1040 as discussed herein.

Although discussions of recording aquatic organisms in X, Y, and Z planes have been discussed, it will be appreciated that no mirror may be required. In one example, the energy beam (e.g., light) is transmitted in a direction that is orthogonal to the plane of FIG. 10 without using the first mirror (e.g., the energy beam is transmitted directly through all or part of the cavity formed by the inner tank 1000). The sensor, or parts of the sensor of the image capture device 1090 may capture aquatic organisms in the X and Y planes as discussed above as well as in the Z plane without another mirror (e.g., without mirror 1040). Similarly, in some embodiments, the energy beam may be reflected by a mirror into the cavity of the inner tank and the sensor, or parts of the sensor of the image capture device 1090 may capture aquatic organisms in the X and Y planes as discussed above as well as in the Z plane without another mirror (e.g., without mirror 1040).

Figure 11:
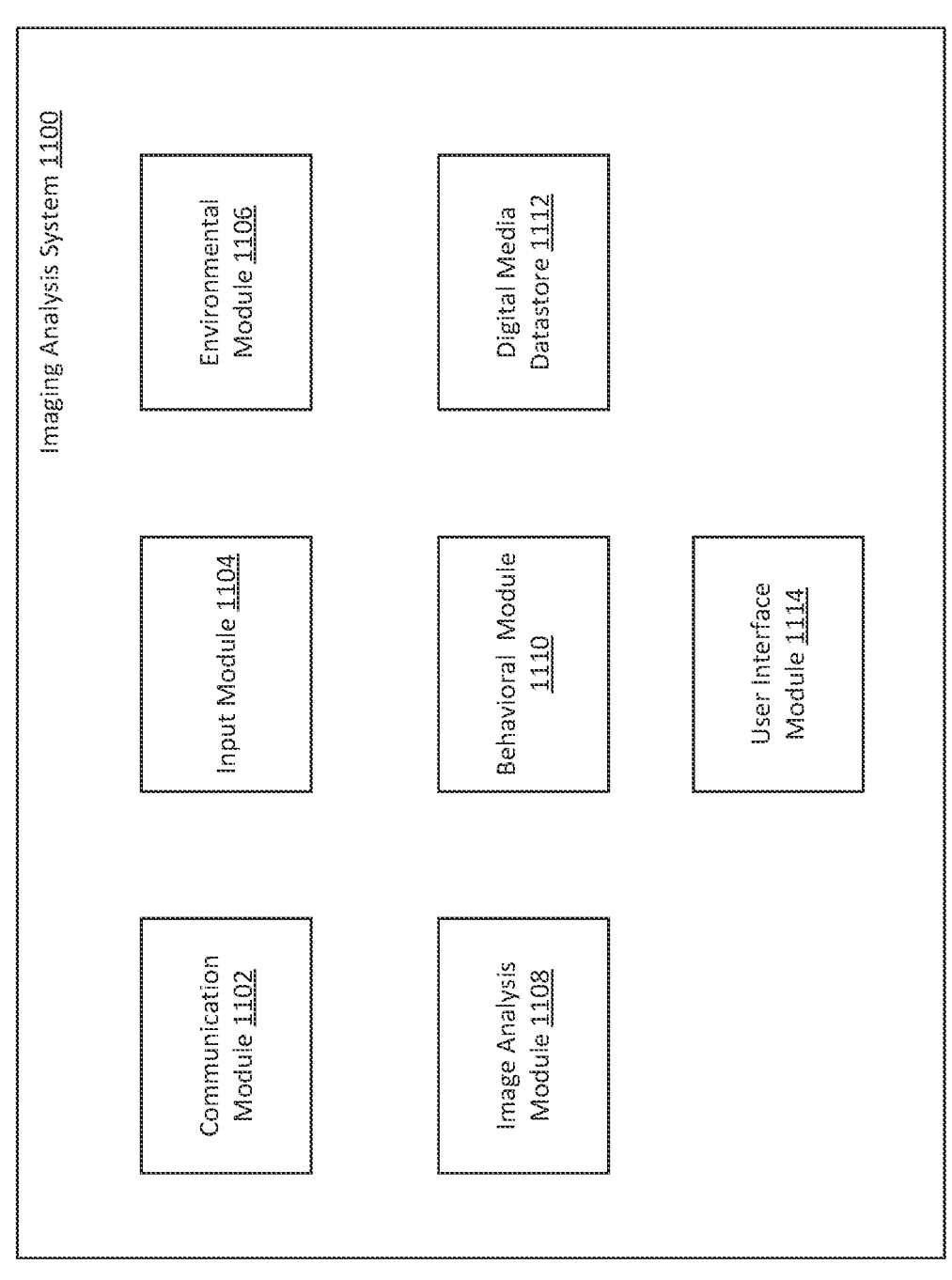
FIG. 11 depicts a block diagram of an image analysis system according to some embodiments.

FIG. 11 depicts a block diagram of an imaging analysis system 1100 according to some embodiments. The image analysis system 1100 may be one or more digital devices. A digital device is any device that includes a processor and memory. Digital devices are further discussed herein.

In some embodiments, image analysis system 1100 may be accessible over a network. In one example, the image analysis system 1100 may include or comprise a server capable of receiving images and/or videos from image capture devices that capture images (e.g., remanent images) from any number of aquatic monitoring systems (e.g., aquatic monitoring systems 200). In various embodiments, the image analysis system 1100 may include a server capable of receiving images and/or videos from image capture devices in any number of independently operated labs. For example, the image analysis system 1100 may be in the cloud and be able to provide analysis regarding any number of images for any number of tanks in any number of labs operated by different third parties. In this example, image analysis system 1100 may identify individual tanks (e.g., based on identifier provided by the image capture devices associated with each individual tank and or a local digital device of that lab that forwards data to the image analysis system 1100) and or identify the lab from which the images were received (e.g., based on identifier provided by the image capture devices associated with each individual tank and or a local digital device of that lab that forwards data to the image analysis system 1100). After analysis of imagery, the image analysis system 1100 may provide a report regarding the health of the aquatic organisms, behavior, and or any information relevant to the environment (e.g., image analysis system 1100 may provide these reports to designated individuals or digital devices using, in part, identifiers associated with tanks and/or identifiers associated with labs).

The imaging analysis system 1100 of FIG. 11 includes a communication module 1102, an input module 1104, an environmental module 1106, an image analysis module 1108, a behavioral analysis module 1110, a digital media datastore 1112, and a user interface module 1114.

The communication module 1102 may enable communication with different components of the aquatic monitoring system including each image capture device associated with each organism tank, optional environment components, and optional control system. In various embodiments, the communication module 1102 may provide remanent image analysis reports to a user interface. In some embodiments, the communication module 1102 may receive input from a user of the aquatic monitoring system, the user may interact with a user interface provided by the remanent imaging analysis system 1100. In one example, the communication module 1102 may receive environmental data from components of the aquatic monitoring system including temperature sensors and ambient light sensors.

The input module 1104 may receive data from a number of sources. For example, the input module 1104 may receive, from an ambient light sensor, an indication of whether it is day or night, this information may be used by the behavioral analysis module 1110. The input module 1104 may receive, from a temperature sensor, current and/or past temperature of the current environment. The input module 1104 may send this data to the environmental module 1106 and/or the behavioral analysis module 1110. In some embodiments, the input module 1104 may receive digital images and digital video from the image capture device of the camera assembly. The input module 1104 may send a request to the digital media datastore 1112 to store the digital images and digital video received from the camera assembly.

The input module 1104 receives input from the user via the user interface. For example, the user may input information such as a time of feeding, the type of food, and the weight of the food being introduced. Food introduced to the tank may be fresh food in the form of Artemia, or brine shrimp, or dried food.

The optional environmental module 1106 may receive environmental data from the input module 1104 regarding ambient light, temperature, thermostat data current, and/or past temperature set on a thermostat.

In some embodiments, the image analysis module 1108 may receive, from the digital media datastore 1112, the digital images and digital video corresponding to remanent images of motion of aquatic organisms in the aquatic monitoring system. The image analysis module 1108 may analyze the movement detected in the remanent images and/or video. The image analysis module 1108 may separate or categorize movement of aquatic organisms and movement of non-aquatic organisms. The image analysis module 1108 may recognize motion of objects greater than a particular size, which correspond to motion of aquatic organisms. Objects which are not aquatic organisms may be categorized as "Non-aquatic organisms" or debris. In some embodiments, non-aquatic organisms may be food or waste from the aquatic organisms. The image analysis module 1108 may recognize the motion of debris.

In some embodiments, the image analysis module 1108 may provide, to a digital device and/or a user interface, a chart of the average position of objects in one or more tanks measured over time. An example of a chart 1300 can be seen in FIG. 13. The image analysis module 1108 may provide information regarding the motion of objects in the tank in many forms, including graphs, tables, or charts. In some embodiments, the image analysis module 1108 may measure a length of trajectories of objects, be they aquatic organisms or non-aquatic organisms, in the tank over time. The behavioral analysis module 1110 may receive the analysis of the remanent images to determine behavior of objects, aquatic organisms and non-aquatic organisms over a period of time.

The behavioral analysis module 1110 may receive environmental data from the environmental module 1106, and information regarding motion of objects in the tank may be obtained by analyzing the remanent images.

Figure 12:
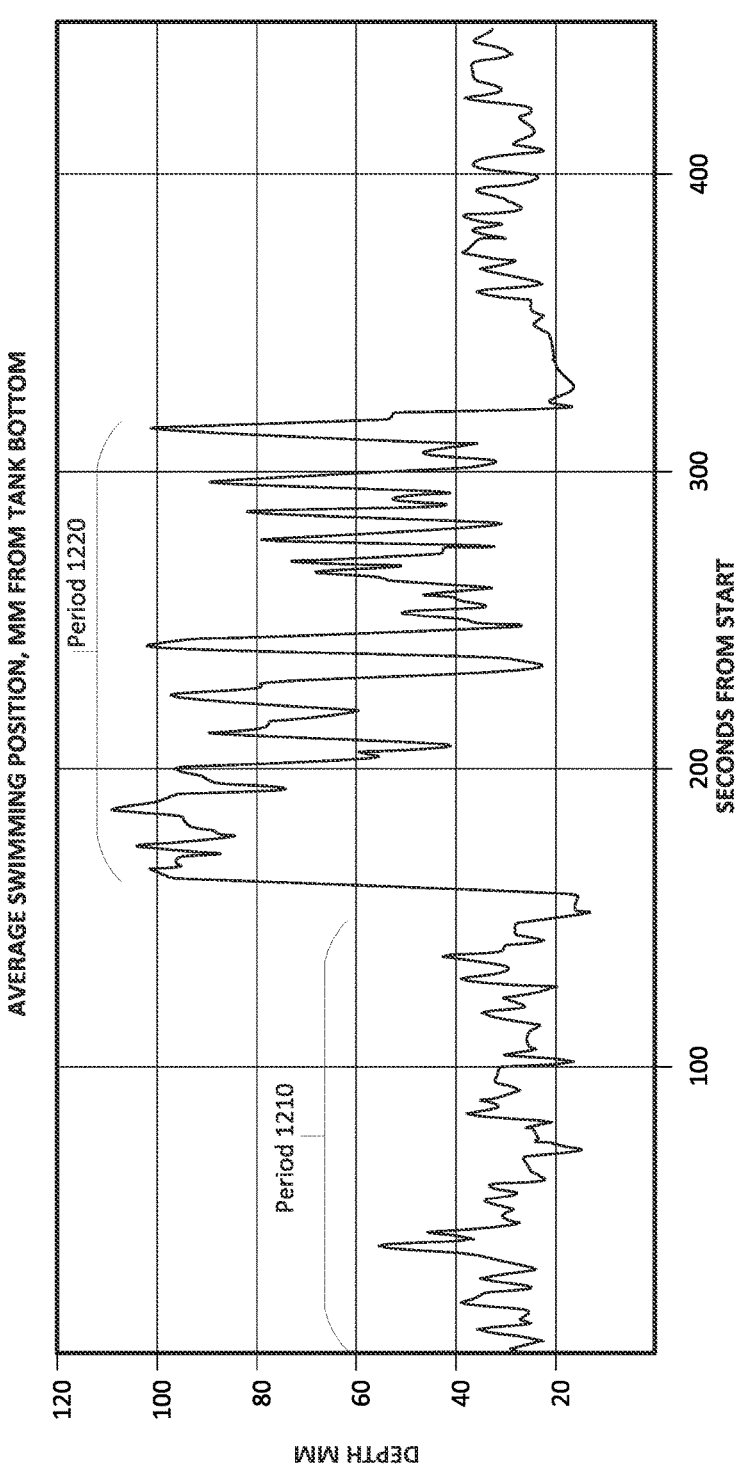
FIG. 12 depicts an example result of remanent imaging analysis according to some embodiments.

Referring to FIG. 12, the behavioral analysis module 1110 may determine a baseline response of objects in the tank over a period of time 1210. The behavioral analysis module 1110 may obtain environmental data, such as amount of ambient light in the environment and time, to determine whether it is night or day, this data along with the remanent image analysis, the behavioral analysis module 1110 may analyze the motion of objects in the tank to determine a behavior. Even if the aquatic organisms in the tank are sleeping, or are at rest, movement or motion of non-aquatic organisms may occur, and the baseline response may be determined.

As seen in the chart 1200 of FIG. 12, during a period 1220, there is an increase in motion of objects in the tank. The behavioral analysis module 1110 may obtain environmental data from the environmental module 1106 and determine that the increased motion during the period 1220 is caused by a response of the aquatic organisms to a change from day to night, or a change in the ambient lighting in the environment of the tank. An initial change in the ambient light may cause a frenzy or a sudden increase in activity of aquatic organisms in the tank. A change in ambient light may not affect the motion or activity of non-aquatic organisms, so determining baseline behavior may be useful in identifying the motion of aquatic organisms.

The digital media datastore 1112 may store digital images and/or digital video from the image capture device of the image capture device assembly (e.g., received from one or more labs). A datastore is any data structure (e.g., one or more tables, databases, and/or the like) for storing information.

The optional user interface module 1114 may provide, to a graphics display of a computer system, a user interface. The user interface may provide a remanent image analysis report to a user of the computer system. In various embodiments, the optional user interface module 1114 provides a dashboard or other information that is accessible to a user (e.g., over the web, in a web page, and/or through an app on a smart device such as a smart phone). An example of the remanent image analysis report can be found in FIG. 14. The user may interact with a user interface provided by the user interface module 1114 to provide input such when the user provides food to the aquatic monitoring system, an amount of food, and a type of food provided to the aquatic monitoring system.

Figure 13:
FIG. 13 depicts an example user interface of the aquatic monitoring system according to some embodiments.

FIG. 13 depicts an example user interface of the aquatic monitoring system according to some embodiments. The top time-series graph, a light vs. time graph 1300 may graph ambient light over time. The time graph 1300 further provides an indication of whether it is day or night.

In one example, the image analysis module 1108 receives remanent images or video of the tank over a period of time. The image analysis module 1108 may separate or categorize motion or activity between aquatic organisms and non-aquatic organisms.

The second graph, an aquatic organism activity graph 1310 may be a time-series graph of activity of aquatic organisms over time. While the third graph, a debris activity graph 1320 may be a time-series graph of activity of non-aquatic organisms over time. The behavioral analysis module 1110 may utilize data from these graphs to determine behavior of aquatic organisms over time.

During a first day-to-night transition, which occurs at time 1330, as indicated in the time graph 1300, the aquatic organism activity graph 1310, and the debris activity graph 1320, a sudden change in ambient light can be seen in time graph 1300. As seen in aquatic organism activity graph 1310, a sudden increase in a length of trajectories of aquatic organisms can be seen in the tank. There is also a related increase in a length of trajectories of non-aquatic organisms which is seen in debris activity graph 1320. An increased motion of the aquatic organisms in tank may result in debris in the tank being stirred up. The behavioral analysis module 1110 may determine that the day-to-night transition causes anxiety or stress to the aquatic organisms.

A first night-to-day transition occurs at time 1340 as indicated in the three graphs. As seen in the aquatic organism activity graph 1310, there is a similar increase in activity during the time right after the night-to-day transition. The increased motion of the aquatic organisms in tank may result in debris in the tank being stirred up. The behavioral analysis module 1110 may determine that the night-to-day transition also causes anxiety or stress to the aquatic organisms, similar to the day-to-night transition.

At the beginning of a time period 1350, after the increase in activity immediately following the initial night-to-day transition, there is a decrease in aquatic organism activity as seen in 1310. A gradual increase in aquatic organism activity can be seen over the course of the time period 1350 in anticipation of a feeding time at time period 1360.

During the time period 1360, a sharp increase in aquatic organism activity, along with the corresponding increase in debris activity, as seen in the debris activity graph 1320. However, the behavioral analysis module 1110 may determine that the motion or trajectories from the debris activity graph 1320 does not correspond to a baseline response of feeding.

The remanent imaging analysis system 111100 may send a notification to the user interface module 1114 (or to any digital device(s)) to provide notices or alarms. For example, the remanent imaging analysis system 111100 may provide an alarm or notice that a feeding was missed, environmental factors appear to be threaten the well being of the aquatic organisms, one or more aquatic organisms appear to be unwell, one or more aquatic organisms appear to be dead, the water is unclear or dirty, there seems to be a significant change in behavior of the aquatic organisms relative to established baselines, an anomaly has occurred, and/or the like.

The notification may be in real-time. The notification may be in the form of a pop-up window on the user interface, an email, automated message on a phone call, a short message/messaging service (SMS), and/or a text message. In some embodiments, the notification may include a short remanent video clip or digital remanent image of the tank during a time frame corresponding to the notification.

During the time period 1370, food is introduced to the tank after the missed feeding time, an increase in motion of the aquatic organisms, as seen in aquatic organism activity graph 1310, and an increase in debris in the debris activity graph 1320 may be seen. The behavioral analysis module 1110 may utilize this information along with data received from the user interface to determine the response to feeding. The behavioral analysis module 1110 may determine properties associated with the feeding session, such as how fast the aquatic organisms are eating, how much food was provided, is the amount of food too much or too little, which can be determined by the debris activity of the tank after the feeding session. Information received from the report, notification, and/or user interface may include a time of feeding, the type of food, and weight of the food being introduced.

FIG. 14 depicts another example user interface 1400 of the aquatic monitoring system summarizing organism activity over a period of time according to some embodiments. The user interface 1400 may include a report that is sent to a computer system or mobile computing device periodically. The report provides a summary of information over a period of time. In one example, the report may be sent weekly or daily.

The user interface 1400 may provide information such as a length of time the aquatic organisms slept, feeding time, percentage of wakefulness versus sleep. The report may also provide information such as a length of feeding, is the amount of food provided too much or too little.

Figure 15:
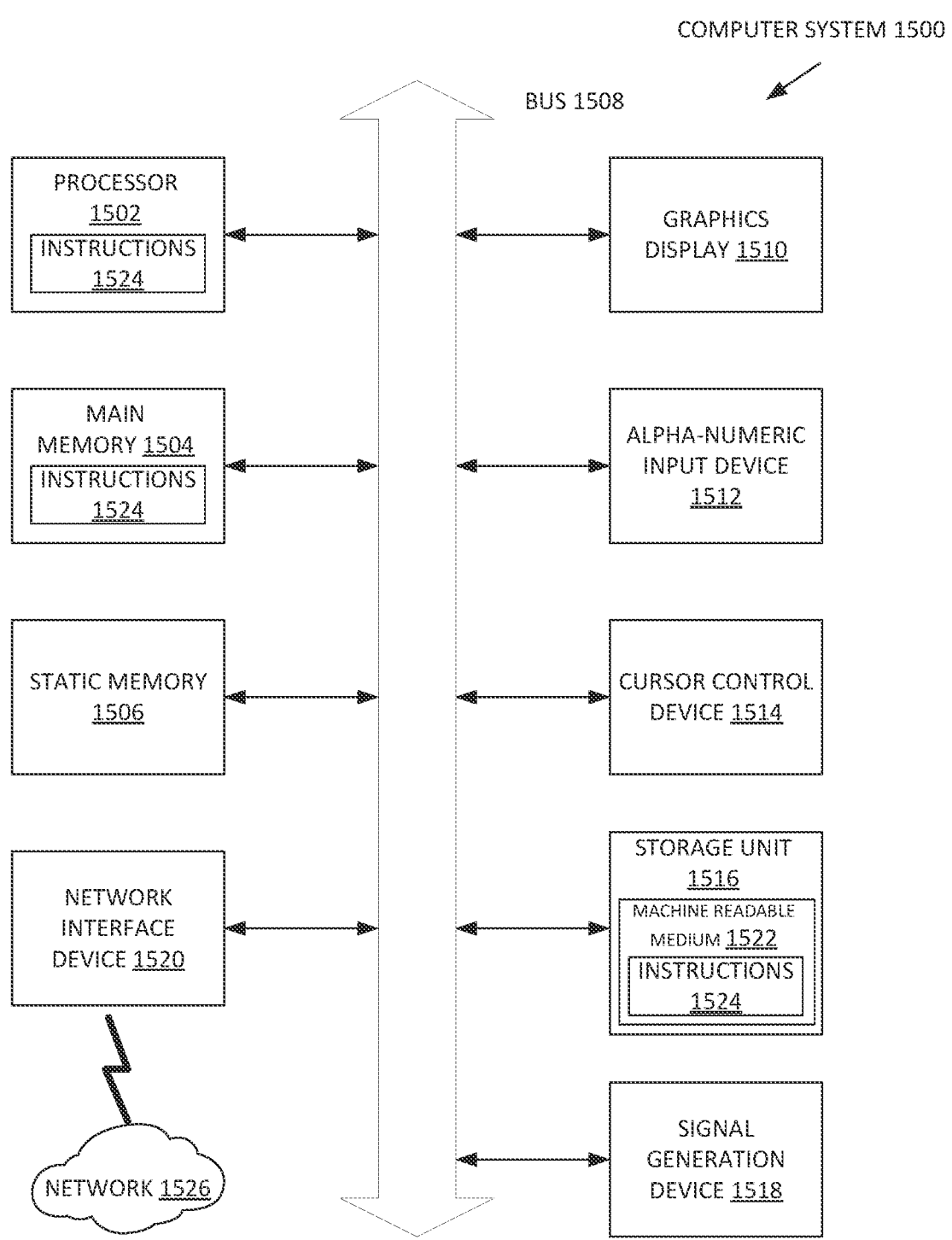
FIG. 15 depicts a block diagram illustrating entities of an example machine according to some embodiments.

FIG. 15 is a block diagram illustrating entities of an example machine able to read instructions from a machine-readable medium and execute those instructions in a processor to perform the machine processing tasks discussed herein, such as the engine operations discussed above. Specifically, FIG. 15 shows a diagrammatic representation of a machine in the example form of a computer system 1500 within which instructions 1524 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web application, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computer system 1500 includes a processor 1502 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 1504, and a static memory 1506, which are configured to communicate with each other via a bus 1508. The computer system 1500 may further include a graphics display unit 1510 (e.g., a plasma display panel (PDP), a liquid crystal display (LCD), a projector, or a cathode ray tube (CRT)). The computer system 1500 may also include an alphanumeric input device 1512 (e.g., a keyboard), a cursor control device 1514 (e.g., a mouse, a trackball, a joystick, a motion sensor, or other pointing instrument), a data store 1516, a signal generation device 1518 (e.g., a speaker), an audio input device 1526 (e.g., a microphone) and a network interface device 1520, which also are configured to communicate via the bus 1508.

The data store 1516 includes a machine-readable medium 1522 on which is stored instructions 1524 (e.g., software) embodying any one or more of the methodologies or functions described herein. The instructions 1524 (e.g., software) may also reside, completely or at least partially, within the main memory 1504 or within the processor 1502 (e.g., within a processor's cache memory) during execution thereof by the computer system 1500, the main memory 1504 and the processor 1502 also constituting machine-readable media. The instructions 1524 (e.g., software) may be transmitted or received over a network (not shown) via network interface 1520.

While machine-readable medium 1522 is shown in an example embodiment to be a single medium, the term "machine-readable medium" should be taken to include a single medium or multiple media (e.g., a centralized or distributed database, or associated caches and servers) able to store instructions (e.g., instructions 1524). The term "machine-readable medium" shall also be taken to include any medium that is capable of storing instructions (e.g., instructions 1524) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent some embodiments, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 15. Alternatively, hardware or software modules may be stored elsewhere within a computing system.

As referenced herein, a computer or computing system includes hardware elements used for the operations described here regardless of specific reference in FIG. 15 to such elements, including for example one or more processors, high speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:

an electromagnetic radiation source, the electromagnetic radiation source configured to emit at least one electromagnetic radiation beam;

a beam expander, the beam expander configured to receive the at least one electromagnetic radiation beam emitted by the electromagnetic radiation source and expand the at least one electromagnetic radiation beam to generate at least one expanded electromagnetic radiation beam;

a first container configured to hold water and aquatic organisms, the first container including a base plate and at least four side walls, at least two of the four side walls being opposite of each other, at least three of the four side walls being substantially perpendicular to the base plate, a fourth side wall of the at least four side walls including a first mirror, the first container including a cavity located between the at least four side walls, the first mirror including a reflective side facing the cavity and configured to direct the at least one expanded electromagnetic radiation beam through the cavity, the first mirror being configured to project the at least one expanded electromagnetic radiation beam in a direction that is parallel to the base plate of the first container; and an image capture device, the image capture device having a field of view, the field of view including at least a portion of the cavity, the image capture device being positioned opposite to the base plate of the first container.

2. The system of claim 1, wherein the first container further includes a water evacuation assembly.

3. The system of claim 2 further comprising, a second container, the second container being positioned in the first container, wherein the field of view of the image capture device includes a portion of the second container.

4. The system of claim 1, further comprising a second mirror, the second mirror being parallel to the at least one expanded electromagnetic radiation beam, the image capture device including at least one sensor, wherein a first portion of the at least one sensor is configured to sense the at least one expanded electromagnetic radiation beam from the cavity and a second portion of the at least one sensor configured to sense the at least one expanded electromagnetic radiation beam via the second mirror.

5. The system of claim 1, wherein the fourth side wall is at an angle relative to the base plate such that the first mirror is angled to direct the at least one expanded electromagnetic radiation beam through the cavity.

6. The system of claim 1, further comprising a lid, the lid being positioned opposite to the base plate, the lid having a surface area that is greater than that of a surface area of the base plate.

7. The system of claim 6, wherein the lid further includes heating pads positioned along a perimeter of the lid.

8. The system of claim 1, wherein the beam expander further includes a collimator.

9. The system of claim 1, wherein the first mirror is coupled to the fourth side wall.

10. The system of claim 3, wherein the fourth side wall is at an angle relative to the base plate such that the first mirror is angled to direct the at least one expanded electromagnetic radiation beam through the second container, the second container being transparent at least in part, the at least one expanded electromagnetic radiation beam being reflected through a transparent portion of the second container in a direction that is substantially parallel to the base plate.

11. A method comprising:

originating an electromagnetic radiation beam from an electromagnetic radiation source;

transmitting the electromagnetic radiation beam through a beam expander, an output of the beam expander being an expanded electromagnetic radiation beam, to a first mirror;

reflecting the expanded electromagnetic radiation beam by the first mirror through a first container, the first container configured to hold water and aquatic organisms, the first container having a base plate and at least four side walls, at least two of four side walls being opposite of each other, at least three of the four side walls being substantially perpendicular to the base plate, a fourth side wall of the at least four side walls including a first mirror, the first container including a cavity located between the at least four side walls, the first mirror including a reflective side facing the cavity, the first mirror being configured to project the electromagnetic radiation beam in a direction that is parallel to the base plate of the first container;

directing, with an image capture device, a field of view to at least a portion of the cavity of the first container; and capturing, with the image capture device, at least one image of the at least the portion of the cavity of the first container that is illuminated at least in part by the reflected expanded electromagnetic radiation beam, the image capture device being position opposite to the base plate of the first container.

12. The method of claim 11, wherein the first container further includes a water evacuation assembly.

13. The method of claim 12, wherein the first container further including a second container, the second container being positioned in the first container, wherein the field of view of the image capture device includes a portion of the second container.

14. The method of claim 13, wherein further comprising capturing, with a second portion of at least one sensor of the image capture device, a second mirror being perpendicular to the expanded electromagnetic radiation beam, wherein capturing, with the image capture device, the at least one image of the at least the portion of the cavity of the first container that is illuminated at least in part by the reflected expanded electromagnetic radiation beam comprises a first portion of at least one sensor of the image capture device capturing the at least one image.

15. The method of claim 14, wherein the second portion and the first portion of the image capture device capture images simultaneously.

16. The method of claim 11, wherein the fourth side wall is at an angle relative to the base plate such that the first mirror is angled to direct the expanded electromagnetic radiation beam through the cavity.

17. The method of claim 11, wherein the first container further comprises a lid, the lid being positioned opposite to the base plate, the lid having a surface area that is greater than that of a surface area of the base plate.

18. The method of claim 17, wherein the lid further includes heating pads positioned along a perimeter of the lid.

19. The method of claim 11, further comprising collimating the electromagnetic radiation beam before reflecting the expanded electromagnetic radiation beam.

20. The method of claim 11, wherein the first mirror is coupled to the fourth side wall.

21. The method of claim 13, wherein reflecting the expanded electromagnetic radiation beam by the first mirror through the first container comprises reflecting the expanded electromagnetic radiation beam by the first mirror through the second container located within the first container, wherein the fourth side wall is at an angle relative to the base plate such that the first mirror is angled to direct the expanded electromagnetic radiation beam through the second container, the second container being transparent at least in part, the expanded electromagnetic radiation beam being reflected through a transparent portion of the second container in a direction that is substantially parallel to the base plate.

\*     \*     \*     \*     \*